(12) United States Patent
Hosoi

(10) Patent No.: US 6,836,594 B2
(45) Date of Patent: Dec. 28, 2004

(54) ARRAY WAVEGUIDE GRATING, ARRAY WAVEGUIDE GRATING MODULE, OPTICAL COMMUNICATION UNIT AND OPTICAL COMMUNICATION SYSTEM

(75) Inventor: Toru Hosoi, Tokyo (JP)

(73) Assignee: NEC Corporation, Tokyo (JP)

( * ) Notice: Subject to any disclaimer, the term of this patent is extended or adjusted under 35 U.S.C. 154(b) by 214 days.

(21) Appl. No.: 10/121,678

(22) Filed: Apr. 15, 2002

(65) Prior Publication Data

US 2002/0150338 A1 Oct. 17, 2002

(30) Foreign Application Priority Data

Apr. 16, 2001 (JP) ........................................ 2001-116749

(51) Int. Cl.[7] ................................................ G02B 6/34
(52) U.S. Cl. .............................. 385/37; 385/43; 398/84
(58) Field of Search .............................. 385/15, 24, 37, 385/39, 43, 47, 50, 129, 132; 398/43, 79, 82, 84, 87

(56) References Cited

U.S. PATENT DOCUMENTS

| | | | | |
|---|---|---|---|---|
| 5,287,424 A | * | 2/1994 | Sheem et al. .................. | 385/39 |
| 6,069,990 A | * | 5/2000 | Okawa et al. ................. | 385/43 |
| 6,169,838 B1 | * | 1/2001 | He et al. ....................... | 385/129 |
| 6,188,818 B1 | * | 2/2001 | Han et al. ...................... | 385/24 |
| 6,195,481 B1 | * | 2/2001 | Nakajima et al. ............. | 385/24 |
| 6,222,956 B1 | * | 4/2001 | Akiba et al. ................... | 385/24 |
| 6,526,203 B1 | * | 2/2003 | Gonzalez et al. .............. | 385/37 |
| 6,556,749 B2 | * | 4/2003 | Uetsuka et al. ................ | 385/37 |
| 6,643,427 B2 | * | 11/2003 | Chiba ........................... | 385/24 |

FOREIGN PATENT DOCUMENTS

| | | |
|---|---|---|
| JP | 04-326308 | 11/1992 |
| JP | 09-297228 | 11/1997 |
| JP | 2002-090561 | 3/2002 |

OTHER PUBLICATIONS

Japanese Office Action dated Jan. 21, 2003, with partial English translation.

* cited by examiner

*Primary Examiner*—Diane I. Lee
(74) *Attorney, Agent, or Firm*—McGinn & Gibb, PLLC

(57) ABSTRACT

First channel waveguides $102_1$ to $102_3$ of an array waveguide grating are connected via a first to a third exponential function shape optical waveguide $111_1$ to $111_3$ to a first sector-shape slab waveguide 105. In a second boundary part 109 which is disposed symmetrically with a first boundary part 108 via a channel waveguide array 104, second channel waveguides $103_1$ to $103_3$ are connected via a first to a third taper shape optical waveguide $112_1$ to $112_3$ to a second sector-shape slab waveguide 106. By adopting exponential function shape optical waveguides 111 at least partly, the optical frequency characteristics can be improved compared to the case of the second degree function shape, and also the degree of freedom can also be improved compared to the case of the rectangular shape.

39 Claims, 21 Drawing Sheets

PRIOR ART FIG.33
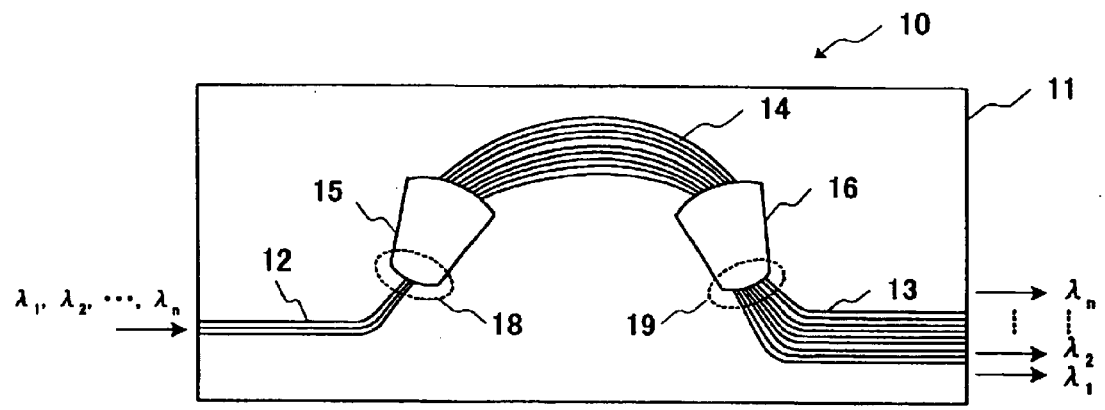
PRIOR ART FIG.34
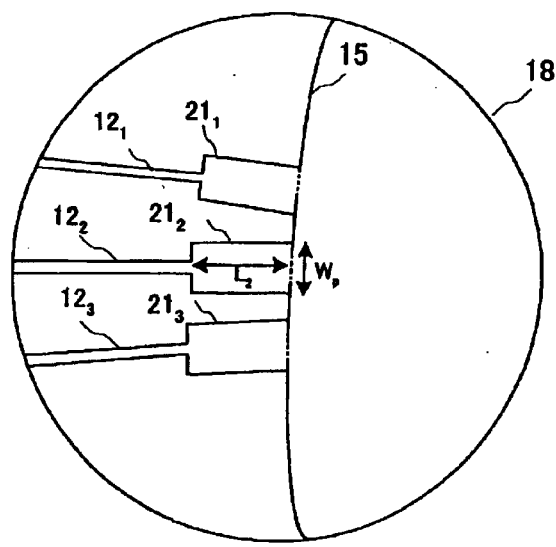

PRIOR ART FIG.35
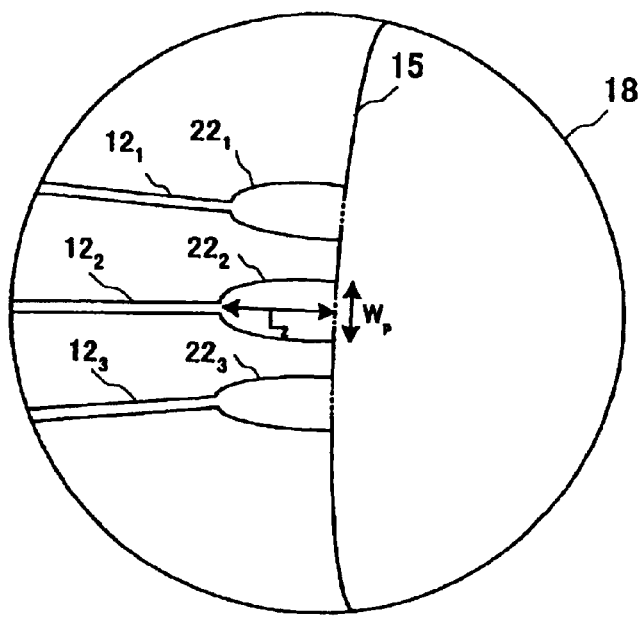
PRIOR ART FIG.36
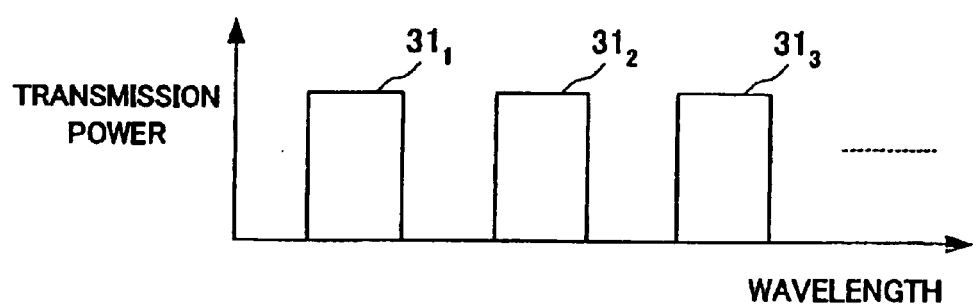

PRIOR ART FIG.37
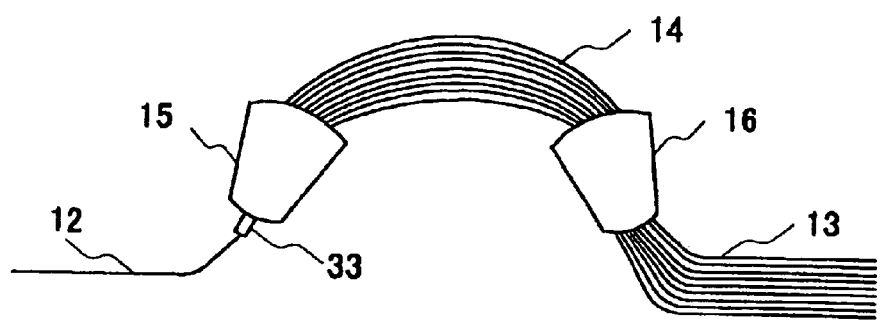
PRIOR ART FIG.38
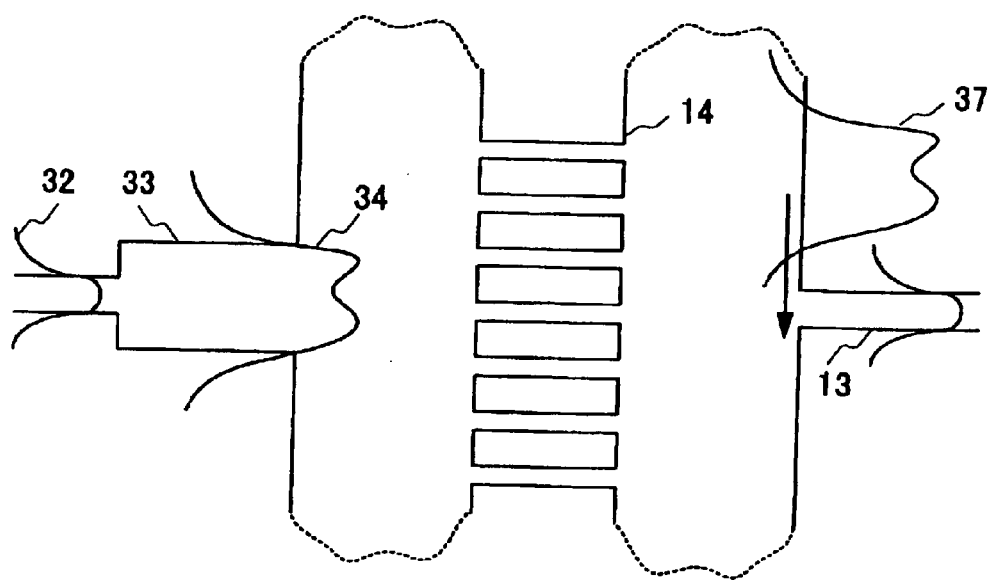

PRIOR ART FIG.39
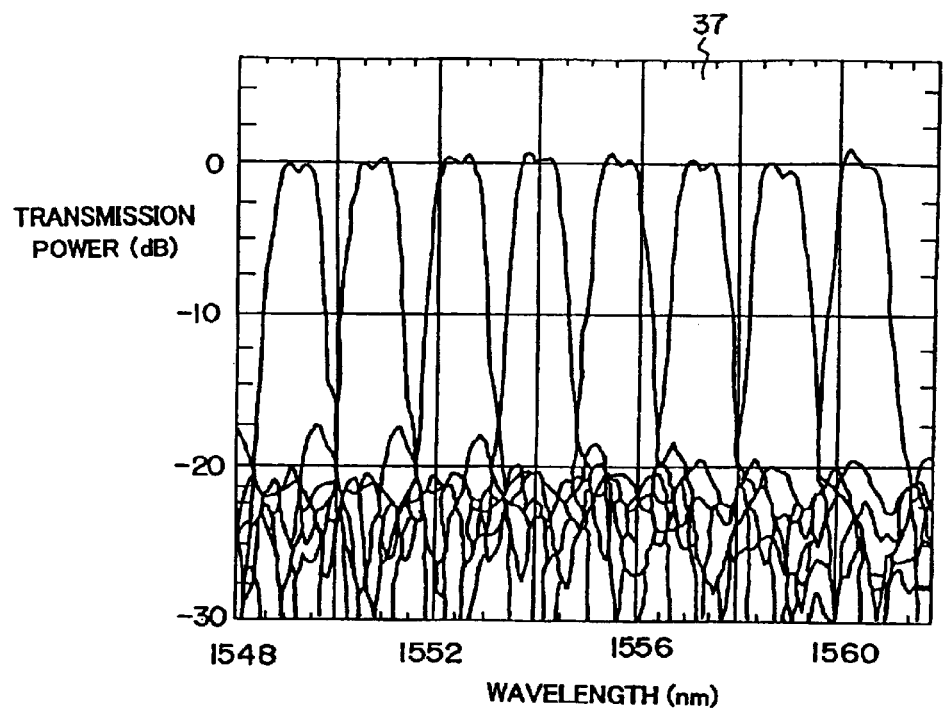
PRIOR ART FIG.40
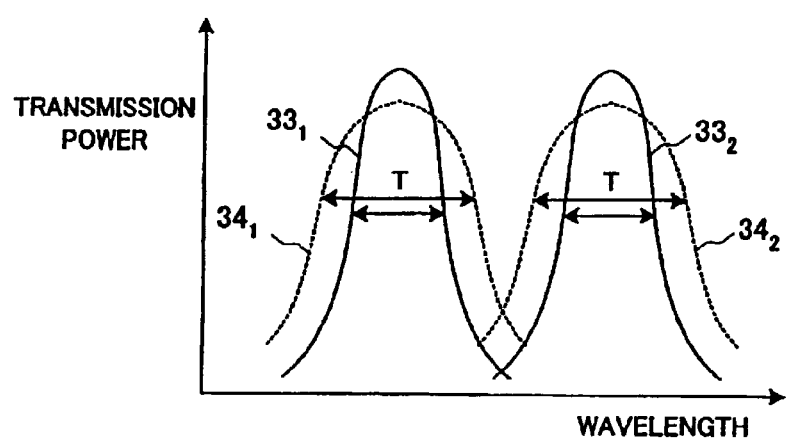

US 6,836,594 B2

ARRAY WAVEGUIDE GRATING, ARRAY WAVEGUIDE GRATING MODULE, OPTICAL COMMUNICATION UNIT AND OPTICAL COMMUNICATION SYSTEM

BACKGROUND OF THE INVENTION

This application claims benefit of Japanese Patent Application No. 2001-116749 filed on Apr. 16, 2001, the contents of which are incorporated by the reference.

The present invention relates to array waveguide gratings used as light wavelength multiplexing/demultiplexing elements for optical communication, array waveguide grating modules, optical communication units and optical communication systems using the same array wavelength lattices. More specifically, the present invention concerns array waveguide gratings with improved light signal frequency characteristics, array waveguide modules, optical communication units and optical communication systems using the same array waveguide gratings.

With processes of usual time internet connection and communication data capacity increase, demands for large capacity data transfer are increasing. In the optical communication using light signals, it is very important for large capacity data transfer to improve the degree of wavelength multiplexing. In this respect, the role of array waveguide gratings as multiplexing/demultiplexing elements for multiplexing and demultiplexing light wavelengths is important, and the array waveguide gratings are thought to be one of key devices. The array waveguide grating has a passive structure, and also has a narrow light wavelength transmission width and a high extinction ratio. The array waveguide grating also has such features as that it can multiplex and demultiplex a number of light signals in correspondence to the number of waveguides.

Such array waveguide grating is desirably free from sudden changes of its output level or loss level with variations of the laser output light signal frequency from the center optical frequency of each optical waveguide. Also, where multiple stages of array waveguide gratings are connected, the modulation components of the light signal are cut off outside a bandwidth, in which the individual array waveguide gratings commonly transmit the light signal. Thus, it is important from the standpoint of improving the light signal transmission efficiency as well to realize a transmission characteristic with a flat peak level with respect to optical frequency.

FIG. 33 shows an example of such array waveguide grating. The illustrated array waveguide grating 10 has a substrate 11, on which one or more first channel waveguides (i.e., input channel waveguides) 12, a plurality of second channel waveguides (i.e., output channel waveguides) 13, a channel waveguide array 14 with a plurality of component channel waveguides bent in a predetermined direction with different radii of curvature, a first sector-shape slab waveguide 15 connecting the first channel waveguides 12 and the channel waveguide array 14 to one another and a second sector-shape slab waveguide 16 connecting the channel waveguide array 14 and the second channel waveguides 13 to one another, are formed. Multiplexed light signals with wavelengths $\lambda_1$ to $\lambda_n$, are incident from the first channel waveguides 12 on the first sector-shape slab waveguide 15, then proceed with their paths expanded therethough and are then incident on the channel waveguide array 14.

In the channel waveguide array 14, the component array waveguides have progressively increasing or reducing optical path lengths with a predetermined optical path length difference provided between adjacent ones of them. Thus, the light beams proceeding through the individual array waveguides reach the second sector-shape slab waveguide 16 with a predetermined phase difference provided between adjacent ones of them. Actually, wavelength dispersion takes place, and the in-phase plane is inclined in dependence on the wavelength. Consequently, the light beams are focused (i.e., converged) on the boundary surface between the second sector-shape slab waveguide 16 and the plurality of second channel waveguides 13 at positions different with wavelengths. The second channel waveguides 13 are disposed at positions corresponding to their respective wavelengths. Given wavelength components $\lambda_1$ to $\lambda_n$ thus can be taken out independently from the second channel waveguides 13.

FIG. 34 shows, to an enlarged scale, a boundary part between the first channel waveguides and the first sector-shape slab waveguide in the array waveguide grating shown in FIG. 33. The first channel waveguides 121 to 123, which are shown in a first boundary part 18 shown in FIG. 33 as well, have optical waveguides 211 to 213 having a rectangular shape with a width Wp and length L2 and terminating in the first sector-shape slab waveguide 15.

FIG. 35 shows a boundary part in the case of using parabolic or second degree function shape waveguides disclosed in Japanese Patent Laid-Open No. 9-297228. In this case, the first channel waveguides 121 to 123 shown in the first boundary part 18 have optical waveguides 221 to 223 having a second degree function shape with a length L2 and terminating with a width Wp in the sector-shape slab waveguide 15.

Insertion loss and transmission width are usually in a trade-off relation to each other. However, where rectangular optical waveguides 211 to 213 shown in FIG. 34 are used in lieu of the second degree function shape light waveguides 221 to 223 shown in FIG. 35, the transmission width can be improved without sacrifice in the insertion loss. It is thus a great merit to use the rectangular optical waveguides 211 to 213 shown in FIG. 34 for realizing a flat transmitted light frequency characteristic.

The above description has concerned with the shapes of the optical waveguides, which are disposed in the first boundary part 18 between the first channel waveguide 12 and the first sector-shape slab waveguide 15 shown in FIG. 33. Such optical waveguides 21 and 22 are provided for the purpose of providing for harmonic mode of input at their locality of contact with the slab waveguide to make the Gaussian waveform peak part as flat as possible.

In lieu of providing the above contrivance with respect to the optical waveguides 21 and 22, the same effects are obtainable by providing optical waveguides of the same shapes in the second boundary part 19 as the boundary between the second channel waveguides 13 and the second sector-shape slab waveguide 16. Here, for the sake of the simplicity of description, only the shapes of the optical waveguides in the first boundary part 18 will be considered.

Where the rectangular optical waveguides 211 to 213 as shown in FIG. 34 are used, the variable shape parameters are only the width Wp and the length L2 of the rectangular part. Therefore, if the width Wp and the length L2 can assume only values limited on the design, it is possible to change the characteristics in such ranges. In other words, in this case a problem is posed that the degree of freedom in fine adjustment and fine design for realizing various properties is very low. For example, the problem may concern the transmission width and the stroke in the trade-off relation to each other. These problems will be discussed in detail in the following.

FIG. 36 shows an ideal characteristic of wavelength multiplexed light signals. In the graph, the ordinate is taken for the transmitted light signal power level, and the abscissa is taken for the wavelength. The individual light signals 311, 312, 313 have a rectangular waveform and also have a maximum transmission width. Thus, signal components of other light signals are not mixed with the signal components of the intrinsic light signals. Where such ideal light signals 311 to 313 are multiplexed, by connecting multiple stages of array waveguide gratings or array waveguide grating modules the bandwidth of the individual light signals is not reduced. The center wavelength of the light signals 311 to 313 may be deviated, but the signal level is not varied. However, no light signal transmitted through such array waveguide grating has such ideal rectangular waveform.

FIG. 37 shows a summary of proposal of an array waveguide grating with a rectangular optical waveguide connected to a slab waveguide. In the Figure, parts like those in FIG. 33 are designated by like reference numerals and symbols. In this proposal, first channel waveguide 12 and first sector-shape slab waveguide 15 are connected to each other by a rectangular waveguide 33.

FIG. 38 shows a way of use of the array waveguide grating shown in FIG. 37 such that multiplexed light signal is spread as it is led from channel waveguide through rectangular optical waveguide and then taken out as light signals each separated for each wavelength. As a light signal 32 passes through a rectangular optical waveguide,33, it is changed to a harmonic mode light signal 34 and spread. The spread light signal is converged through a channel waveguide array 14 and at positions each peculiar for each wavelength. The converged light signal 37 is separated and taken out for each wavelength in such a form as to correspond to the position of a second channel waveguide 13.

FIG. 39 shows optical frequency characteristics of light signals taken out in the example shown in FIG. 38. As shown, individual light signals 37 are multiplexed with a high density, and skirt portions of adjacent light signals and also skirt portions of light signals at spaced-apart positions are complicatedly intrude in the wavelength ranges of intrinsic light signals.

FIG. 40 shows light signals of two adjacent channels. Light signals 331 and 332 shown by solid curves have a smaller transmission width T as shown by arrows than the case of light signals 341 and 342 shown by broken lines, but the influence of noise components due to cross-talk is less. However, the light signals 331 and 332 are sharper in waveform than the light signals 341 and 342, and therefore they are subject to greater loss in the case of deviation from the center wavelength. As shown, the optical frequency characteristic varies with the light signal waveform shape. For this reason, when building a communication system, it is necessary to determine the optical frequency characteristic of the array waveguide grating or the array waveguide grating module on ,the basis of a desire of giving preference to the transmission width or attaching importance to the cross-talk. For example, in the case of a trunk communication system it is possible that light signal is relayed at many places as it is transferred, and it is thought to attach importance to the cross-talk for minimizing the deterioration of signal. In the case of a terminal communication system, on the other hand, simpler circuit devices than those in the trunk system are used. In this circumstance, a certain extent of deviation from the center wavelength of each signal channel has to be allowed. In this case, importance thus may be attached to the transmission width.

Thus, as described before, with the rectangular optical waveguides 211 to 213 as shown in FIG. 34 the degree of freedom of changing the optical frequency characteristics in dependence on the circumstance with the array waveguide grating used therein is low. In this respect, the optical waveguides 221 to 223 having the second degree function shape as shown in FIG. 35 become attractive.

However, the wavelength multiplexing degree improvement demand is on a trend of being increased more and more. When the channel width of each light signal is correspondingly reduced, the gap width between the signal transmission widths of adjacent channel light signals are relatively reduced to strengthen the degree of inter-channel interference, thus resulting in relative cross-talk deterioration. In this situation, it is difficult to manufacture array waveguide gratings or array waveguide grating modules, which permit satisfactorily setting transmission width and cross-talk for meeting demands for various communication systems.

SUMMARY OF THE INVENTION

An object of the present invention, therefore, is to provide array waveguide gratings, array waveguide grating modules and optical communication systems capable of increasing the degree of freedom of optical frequency characteristics and obtaining transmitted light of flatter characteristics than in the case where second degree function shape optical waveguides are used for connecting channel waveguide and slab waveguide to one another.

According to a first aspect of the present invention, there is provided an array waveguide grating comprising: a predetermined substrate; a first and a second channel waveguide for light wave transfer on the substrate; a channel waveguide array having a plurality of component waveguides having lengths progressively increasing with a predetermined difference between adjacent ones of the waveguides on the substrate; a first slab waveguide for connecting the ends of the first channel waveguides and one end of the channel waveguide array via a waveguide part having a first shape on the substrate; and a second slab waveguide for connecting one end of the second channel waveguides and the other end of the channel waveguide array via a waveguide part having a second shape on the substrate; wherein: at least the open part of each of the first channel waveguides on the side of the first slab waveguide or the open part of each of the second channel waveguides on the side of the second slab waveguide is flaring in an exponential function shape toward the channel waveguide array.

According to a second aspect of the present invention, there is provided an array waveguide grating comprising: a predetermined substrate; a first and a second channel waveguide for light wave transfer on the substrate; a channel waveguide array having a plurality of component waveguides having lengths progressively increasing with a predetermined difference between adjacent ones of the waveguides on the substrate; a first slab waveguide for connecting the ends of the first channel waveguides and one end of the channel waveguide array via a waveguide part having a first shape on the substrate; and a second slab waveguide for connecting one end of the second channel waveguides and the other end of the channel waveguide array via a waveguide part having a second shape on the substrate; wherein: at least a part of at least the open part of each of the first channel waveguides on the side of the first slab waveguide or the open part of each of the second channel waveguides on the side of the second slab waveguide is flaring in an exponential function shape toward the channel waveguide array.

In a third aspect of the present invention according to the first or second aspect, the shape W(X) flaring in the exponential function shape is represented as $$W(X)=(Wp-Wc)*(1-\exp(-a*X))+Wc$$

where X represents the light wave progress direction, Wp is the width of the end of the shape connected to the slab waveguide, Wc is the spread of the waveguide part in directions perpendicular to the light wave progress direction X, and a represents a parameter (i.e., shape variable) giving the exponential function shape.

In a fourth aspect of the present invention according to the third aspect, wherein the shape variable a giving the exponential function shape is unity or below.

In a fifth aspect of the present invention according to the third aspect, both of the first and second shape waveguide parts have a shape part flaring from in an exponential function shape from the side of the channel waveguides toward the channel waveguide array and are different in the value of the shape variable a from each other.

In a sixth aspect of the present invention according to the third aspect, at least either the open part of each of the first channel waveguides on the side of the first slab waveguide or the open part of each of the second channel waveguides on the side of the second slab waveguide has a shape part flaring in an exponential function shape toward the channel waveguide array, and the value of the shape variable a is set independently to a value corresponding to a corresponding channel waveguide.

In a seventh aspect of the present invention according to the second aspect, wherein parts of the first and second shape waveguide parts which do not have any shape part flaring in the exponential function shape have a taper shape.

In an eighth aspect of the present invention according to the second aspect, parts of the first and second shape waveguide parts which do not have any shape part flaring in the exponential function shape have a second degree function shape.

In a ninth aspect of the present invention according to the second aspect, parts of the first and second shape waveguide parts which do not have any shape part flaring in the exponential function shape have both a taper shape and a second degree function shape. In a tenth aspect of the present invention according to the second aspect, the other shapes in the case of a part containing a shape part flaring in the exponential function shape consist of a taper shape part. In an eleventh aspect of the present invention according to the second aspect, the other shapes in the case of a part containing a shape part flaring in the exponential function shape consist of a second degree function shape part.

In a twelfth aspect of the present invention according to the second aspect, the other shapes in the case of a part containing a shape part flaring in the exponential function shape consist of a taper shape part and a second degree function shape part.

According to a thirteenth aspect of the present invention, there is provided an array waveguide grating comprising: a predetermined substrate; a first and a second channel waveguide for light wave transfer on the substrate; a channel waveguide array having a plurality of component waveguides having lengths progressively increasing with a predetermined difference between adjacent ones of the waveguides on the substrate; a first slab waveguide for connecting the ends of the first channel waveguides and one end of the channel waveguide array via a waveguide part having a first shape on the substrate; and a second slab waveguide for connecting one end of the second channel waveguides and the other end of the channel waveguide array via a waveguide part having a second shape on the substrate; wherein: at least the open part of each of the first channel waveguides on the side of the first slab waveguide or the open part of each of the second channel waveguides with respect to the second slab waveguide has a shape part flaring in an exponential function shape represented by a function of a degree higher than the second degree toward the channel waveguide array.

According to a fourteenth aspect of the present invention, there is provided an array waveguide grating comprising: first and second channel waveguides for light wave transfer; a channel waveguide array having a plurality of component waveguides having lengths progressively increasing with a predetermined difference between adjacent ones of the waveguides; a first slab waveguide disposed between the first channel waveguides and one end of the channel waveguide array; and a second slab waveguide disposed between the second channel waveguides and the other end of the channel waveguide array; wherein: at least the open part of each of the first channel waveguides on the side of the first slab waveguide or the open part of each of the second channel waveguides on the side of the second slab waveguide has an open end with an opening width greater than the waveguide width of the first or second channel waveguides; and the shape directed from the stem part of the open part toward the open end is found on the inner side of rectangular shape of the opening width and on the outer side of a second degree curve connecting the stem part and the open end.

In a fifteenth aspect of the present invention according to the thirteenth aspect, the flaring shape part represented by the function of a degree higher than the second degree has such a convex shape that when frequency multiplexed Gaussian waveform light waves pass through their waveguides, their characteristics line in a rage between boundary ranges of characteristics with respect to the transmission width and the cross-talk when they pass through the rectangular waveguides and second degree function shape waveguides.

According to a sixteenth aspect of the present invention, there is provided an array waveguide grating module comprising; an array waveguide grating including a predetermined substrate, a first and a second channel waveguide for light wave transfer on the substrate, a channel waveguide array having a plurality of component waveguides having lengths progressively increasing with a predetermined difference between adjacent ones of the waveguides on the substrate, a first slab waveguide for connecting the ends of the first channel waveguides and one end of the channel waveguide array via a waveguide part having a first shape on the substrate, and a second slab waveguide for connecting one end of the second channel waveguides and the other end of the channel waveguide array via a waveguide part having a second shape on the substrate, wherein at least the open part of each of the first channel waveguides on the side of the first slab waveguide or the open part of each of the second channel waveguides on the side of the second slab waveguide is flaring in an exponential function shape toward the channel waveguide array; and an optical fiber having one end optically connected to at least part of the first or second channel waveguides of the array waveguide grating.

According to a seventeenth aspect of the present inventions there is provided an array waveguide grating module comprising: an array waveguide grating including a predetermined substrate, a first and a second channel waveguide for light wave transfer on the substrate, a channel waveguide array having a plurality of component waveguides having lengths progressively increasing with a predetermined difference between adjacent ones of the waveguides on the substrate, a first slab waveguide for connecting the ends of the first channel waveguides and one end of the channel waveguide array via a waveguide part having a first shape on the substrate, and a second slab waveguide for connecting one end of the second channel waveguides and the other end of the channel waveguide array via a waveguide part having a second shape on the substrate; wherein at least a part of at least the open part of each of the first channel waveguides on the side of the first slab waveguide or the open part of each of the second channel waveguides on the side of the second slab waveguide is flaring in an exponential function shape toward the channel waveguide array; and an optical fiber having one end optically connected to at least part of the first or second channel waveguides of the array waveguide grating.

According to an eighteenth aspect of the present invention, there is provided an array waveguide grating module comprising; an array waveguide grating including first and second channel waveguides for light wave transfer, a channel waveguide array having a plurality of component waveguides having lengths progressively increasing with a predetermined difference between adjacent ones of the waveguides, a first slab waveguide disposed between the first channel waveguides and one end of the channel waveguide array and a second slab waveguide disposed between the second channel waveguides and the other end of the channel waveguide array, wherein at least the open part of each of the first channel waveguides on the side of the first slab waveguide or the open part of each of the second channel waveguides on the side of the second slab waveguide has an open end with an opening width greater than the waveguide width of the first or second channel waveguides, and the shape directed from the stem part of the open part toward the open end is found on the inner side of rectangular shape of the opening width and on the outer side of a second degree curve connecting the stem part and the open end; and an optical fiber having one end optically connected to at least part of the first or second channel waveguides of the array waveguide grating.

In a nineteenth aspect of the present invention according to the sixteenth or seventeenth aspect, the shape W(X) flaring in the exponential function shape is represented as $$W(X)=(Wp-Wc)*(1-\exp(-a*X))+Wc$$

where X represents the light wave progress direction, Wp is the width of the end of the shape connected to the slab waveguide, Wc is the spread of the waveguide part in directions perpendicular to the light wave progress direction X, and a represents a parameter (i.e., shape variable) giving the exponential function shape.

In a twentieth aspect of the present invention according to the nineteenth aspect, the shape variable a giving the exponential function shape is unity or below.

In a twenty-first aspect of the present invention according to the nineteenth aspect, both of the first and second shape waveguide parts have a shape part flaring from in an exponential function shape from the side of the channel waveguides toward the channel waveguide array and are different in the value of the shape variable a from each other.

In a twenty-second aspect of the present invention according to the nineteenth aspect, at least either the open part of each of the first channel waveguides on the side of the first slab waveguide or the open part of each of the second channel waveguides on the side of the second slab waveguide has a shape part flaring in an exponential function shape toward the channel waveguide array, and the value of the shape variable a is set independently to a value corresponding to a corresponding channel waveguide.

In a twenty-third aspect of the present invention according to the sixteenth or seventeenth aspect, parts of the first and second shape waveguide parts which do not have any shape part flaring in the exponential function shape have a taper shape.

In a twenty-fourth aspect of the present invention according to the sixteenth or seventeenth aspect, parts of the first and second shape waveguide parts which do not have any shape part flaring in the exponential function shape have a second degree function shape.

In a twenty-fifth aspect of the present invention according to the sixteenth or seventeenth aspect, parts of the first and second shape waveguide parts which do not have any shape part flaring in the exponential function shape have both a taper shape and a second degree function shape.

In a twenty-sixth aspect of the present invention according to the seventeenth aspect, the other shapes in the case of a part containing a shape part flaring in the exponential function shape consist of a taper shape part.

In a twenty-seventh aspect of the present invention according to the seventeenth aspect, the other shapes in the case of a part containing a shape part flaring in the exponential function shape consist of a second degree function shape part.

In a twenty-eighth aspect of the present invention according to the seventeenth aspect, the other shapes in the case of a part containing a shape part flaring in the exponential function shape consist of a taper shape part and a second degree function shape part.

In a twenty-ninth aspect of the present invention, there is provided an array waveguide grating module comprising: an array waveguide grating including a predetermined substrate, a first and a second channel waveguide for light wave transfer on the substrate, a channel waveguide array having a plurality of component waveguides having lengths progressively increasing with a predetermined difference between adjacent ones of the waveguides on the substrate, a first slab waveguide for connecting the ends of the first channel waveguides and one end of the channel waveguide array via a waveguide part having a first shape on the substrate, and a second slab waveguide for connecting one end of the second channel waveguides and the other end of the channel waveguide array via a waveguide part having a second shape on the substrate, wherein at least the open part of each of the first channel waveguides on the side of the first slab waveguide or the open part of each of the second channel waveguides with respect to the second slab waveguide has a shape part flaring in an exponential function shape represented by a function of a degree higher than the second degree toward the channel waveguide array; and an optical fiber having one end optically connected to at least part of the first or second channel waveguides of the array waveguide grating.

In a thirty aspect of the present invention according to the twenty-ninth aspect, the flaring shape part represented by the function of a degree higher than the second degree has such a convex shape that when frequency multiplexed Gaussian waveform light waves pass through their waveguides, their characteristics line in a rage between boundary ranges of characteristics with respect to the transmission width and the cross-talk when they pass through the rectangular waveguides and second degree function shape waveguides.

According to a thirty-first aspect of the present invention, there is provided an optical communication system comprising: an optical transmission means for sending out light signals of different wavelengths as parallel signals; a multiplexer constituted by an array waveguide grating for wavelength multiplexing/demultiplexing each of the different wavelength light signals sent out from the optical transmission means; an optical transmission line, to which the wavelength divided and multiplexed light signals outputted from the multiplexer are sent; a node provided in the optical transmission line and having an array waveguide grating; a demultiplexer constituted by an array waveguide array for receiving input light signal set along the optical transmission line via the node; and an optical receiving means for receiving the demultiplexed different wavelength light signals from the demultiplexer; wherein the demultiplexer includes a predetermined substrate, a first and a second channel waveguide for light wave transfer on the substrate, a channel waveguide array having a plurality of component waveguides having lengths progressively increasing with a predetermined difference between adjacent ones of the waveguides on the substrate, a first slab waveguide for connecting the ends of the first channel waveguides and one end of the channel waveguide array via a waveguide part having a first shape on the substrate, and a second slab waveguide for connecting one end of the second channel waveguides and the other end of the channel waveguide array via a waveguide part having a second shape on the substrate, and at least the open part of each of the first channel waveguides on the side of the first slab waveguide or the open part of each of the second channel waveguides on the side of the second slab waveguide is flaring in an exponential function shape toward the channel waveguide array.

According to a thirty-second aspect of the present invention, there is provided an optical communication system comprising: an optical transmission means for sending out light signals of different wavelengths as parallel signals; a multiplexer constituted by an array waveguide grating for wavelength multiplexing/demultiplexing each of the different wavelength light signals sent out from the optical transmission means; an optical transmission line, to which the wavelength divided and multiplexed light signals outputted from the multiplexer are sent; a node provided in the optical transmission line and having an array waveguide grating; a demultiplexer constituted by an array waveguide array for receiving input light signal set along the optical transmission line via the node; and an optical receiving means for receiving the demultiplexed different wavelength light signals from the demultiplexer; wherein the demultiplexer includes a predetermined substrate, a first and a second channel waveguide for light wave transfer on the substrate, a channel waveguide array having a plurality of component waveguides having lengths progressively increasing with a predetermined difference between adjacent ones of the waveguides on the substrate, a first slab waveguide for connecting the ends of the first channel waveguides and one end of the channel waveguide array via a waveguide part having a first shape on the substrate, and a second slab waveguide for connecting one end of the second channel waveguides and the other end of the channel waveguide array via a waveguide part having a second shape on the substrate, and at least a part of at least the open part of each of the first channel waveguides on the side of the first slab waveguide or the open part of each of the second channel waveguides on the side of the second slab waveguide is flaring in an exponential function shape toward the channel waveguide array.

According to a thirty-third aspect of the present invention, there is provided an optical communication system comprising: an optical transmission means for sending out light signals of different wavelengths as parallel signals; a multiplexer constituted by an array waveguide grating for wavelength multiplexing/demultiplexing each of the different wavelength light signals sent out from the optical transmission means; an optical transmission line, to which the wavelength divided and multiplexed light signals outputted from the multiplexer are sent; a node provided in the optical transmission line and having an array waveguide grating; a demultiplexer constituted by an array waveguide array for receiving input light signal set along the optical transmission line via the node; and an optical receiving means for receiving the demultiplexed different wavelength light signals from the demultiplexer; wherein the demultiplexer includes a predetermined substrate, a first and a second channel waveguide for light wave transfer on the substrate, a channel waveguide array having a plurality of component waveguides having lengths progressively increasing with a predetermined difference between adjacent ones of the waveguides on the substrate, a first slab waveguide for connecting the ends of the first channel waveguides and one end of the channel waveguide array via a waveguide part having a first shape on the substrate, and a second slab waveguide for connecting one end of the second channel waveguides and the other end of the channel waveguide array via a waveguide part having a second shape on the substrate, and includes at least the open part of each of the first channel waveguides on the side of the first slab waveguide or the open part of each of the second channel waveguides with respect to the second slab waveguide has a shape part flaring in an exponential function shape represented by a function of a degree higher than the second degree toward the channel waveguide array.

According to a thirty-fourth aspect of the present invention, there is provided an optical communication system comprising: an optical transmission means for sending out light signals of different wavelengths as parallel signals; a multiplexer constituted by an array waveguide grating for wavelength multiplexing/demultiplexing each of the different wavelength light signals sent out from the optical transmission means; an optical transmission line, to which the wavelength divided and multiplexed light signals outputted from the multiplexer are sent; a node provided in the optical transmission line and having an array waveguide grating; a demultiplexer constituted by an array waveguide array for receiving input light signal set along the optical transmission line via the node; and an optical receiving means for receiving the demultiplexed different wavelength light signals from the demultiplexer; wherein the demultiplexer including first and second channel waveguides for light wave transfer, a channel waveguide array having a plurality of component waveguides having lengths progressively increasing with a predetermined difference between adjacent ones of the waveguides, a first slab waveguide disposed between the first channel waveguides and one end of the channel waveguide array, and a second slab waveguide disposed between the second channel waveguides and the other end of the channel waveguide array, and at least the open part of each of the first channel waveguides on the side of the first slab waveguide or the open part of each of the second channel waveguides on the side of the second slab waveguide has an open end with an opening width greater than the waveguide width of the first or second channel waveguides, and the shape directed from the stem part of the open part toward the open end is found on the inner side of rectangular shape of the opening width and on the outer side of a second degree curve connecting the stem part and the open end.

In a thirty-fifth aspect of the present invention according to the thirty-third aspect, the flaring shape part represented by the function of a degree higher than the second degree has such a convex shape that when frequency multiplexed Gaussian waveform light waves pass through their waveguides, their characteristics line in a rage between boundary ranges of characteristics with respect to the transmission width and the cross-talk when they pass through the rectangular waveguides and second degree function shape waveguides.

According to a thirty-sixth aspect of the present invention, there is provided an optical communication system comprising a plurality of nodes connected by transfer lines into a loop form, wavelength multiplexed and demultiplexed light signals being transferred along the loop form transfer line, the nodes each including a first array waveguide grating for demultiplexing the multiplexed light signal into light signals of different wavelengths and a second array waveguide grating for multiplexing the demultiplexed light signals of the different wavelengths, wherein the first array waveguide grating includes a predetermined substrate, a first and a second channel waveguide for light wave transfer on the substrate, a channel waveguide array having a plurality of component waveguides having lengths progressively increasing with a predetermined difference between adjacent ones of the waveguides on the substrate, a first slab waveguide for connecting the ends of the first channel waveguides and one end of the channel waveguide array via a waveguide part having a first shape on the substrate, and a second slab waveguide for connecting one end of the second channel waveguides and the other end of the channel waveguide array via a waveguide part having a second shape on the substrate, and at least the open part of each of the first channel waveguides on the side of the first slab waveguide or the open part of each of the second channel waveguides on the side of the second slab waveguide is flaring in an exponential function shape toward the channel waveguide array.

According to a thirty-seventh aspect of the present invention, there is provided an optical communication system comprising a plurality of nodes connected by transfer lines into a loop form, wavelength multiplexed and demultiplexed light signals being transferred along the loop form transfer line, the nodes each including a first array waveguide grating for demultiplexing the multiplexed light signal into light signals of different wavelengths and a second array waveguide grating for multiplexing the demultiplexed light signals of the different wavelengths, wherein the first array waveguide grating includes a predetermined substrate, a first and a second channel waveguide for light wave transfer on the substrate, a channel waveguide array having a plurality of component waveguides having lengths progressively increasing with a predetermined difference between adjacent ones of the waveguides on the substrate, a first slab waveguide for connecting the ends of the first channel waveguides and one end of the channel waveguide array via a waveguide part having a first shape on the substrate, a second slab waveguide for connecting one end of the second channel waveguides and the other end of the channel waveguide array via a waveguide part having a second shape on the substrate, and at least a part of at least the open part of each of the first channel waveguides on the side of the first slab waveguide or the open part of each of the second channel waveguides on the side of the second slab waveguide is flaring in an exponential function shape toward the channel waveguide array.

According to a thirty-eighth aspect of the present invention, there is provided an optical communication system comprising a plurality of nodes connected by transfer lines into a loop form, wavelength multiplexed and demultiplexed light signals being transferred along the loop form transfer line, the nodes each including a first array waveguide grating for demultiplexing the multiplexed light signal into light signals of different wavelengths and a second array waveguide grating for multiplexing the demultiplexed light signals of the different wavelengths, wherein the first array waveguide grating includes a predetermined substrate, a first and a second channel waveguide for light wave transfer on the substrate, a channel waveguide array having a plurality of component waveguides having lengths progressively increasing with a predetermined difference between adjacent ones of the waveguides on the substrate, a first slab waveguide for connecting the ends of the first channel waveguides and one end of the channel waveguide array via a waveguide part having a first shape on the substrate, a second slab waveguide for connecting one end of the second channel waveguides and the other end of the channel waveguide array via a waveguide part having a second shape on the substrate, and at least the open part of each of the first channel waveguides on the side of the first slab waveguide or the open part of each of the second channel waveguides with respect to the second slab waveguide has a shape part flaring in an exponential function shape represented by a function of a degree higher than the second degree toward the channel waveguide array.

According to a thirty-ninth aspect of the present invention, there is provided an optical communication system comprising a plurality of nodes connected by transfer lines into a loop form, wavelength multiplexed and demultiplexed light signals being transferred along the loop form transfer line, the nodes each including a first array waveguide grating for demultiplexing the multiplexed light signal into light signals of different wavelengths and a second array waveguide grating for multiplexing the demultiplexed light signals of the different wavelengths, wherein the first array waveguide grating includes first and second channel waveguides for light wave transfer, a channel waveguide array having a plurality of component waveguides having lengths progressively increasing with a predetermined difference between adjacent ones of the waveguides, a first slab waveguide disposed between the first channel waveguides and one end of the channel waveguide array, a second slab waveguide disposed between the second channel waveguides and the other end of the channel waveguide array, at least the open part of each of the first channel waveguides on the side of the first slab waveguide or the open part of each of the second channel waveguides on the side of the second slab waveguide has an open end with an opening width greater than the waveguide width of the first or second channel waveguides, and the shape directed from the stem part of the open part toward the open end is found on the inner side of rectangular shape of the opening width and on the outer side of a second degree curve connecting the stem part and the open end.

In a fortieth aspect of the present invention according to the thirty-eighth aspect, the flaring shape part represented by the function of a degree higher than the second degree has such a convex shape that when frequency multiplexed Gaussian waveform light waves pass through their waveguides, their characteristics line in a rage between boundary ranges of characteristics with respect to the transmission width and the cross-talk when they pass through the rectangular waveguides and second degree function shape waveguides.

Other objects and features will be clarified from the following description with reference to attached drawings.

BRIEF DESCRIPTION OF THE DRAWINGS

FIG. 33 shows an example of prior art array waveguide grating;

FIG. 34 shows, to an enlarged scale, a boundary part between the first channel waveguides and the first sector-shape slab waveguide in the array waveguide grating shown in FIG. 33;

FIG. 35 shows a boundary part in the case of using parabolic or second degree function shape waveguides shown in FIG. 33;

FIG. 36 shows an ideal characteristic of wavelength multiplexed light signals;

FIG. 37 shows a summary of proposal of an array waveguide grating with a rectangular optical waveguide connected to a slab waveguide;

FIG. 38 shows a way of output of wavelength-separated signal after spread through the channel waveguide and rectangular optical waveguide;

FIG. 39 shows optical frequency characteristics of light signals taken out in the example shown in FIG. 38; and FIG. 40 shows light signals of two adjacent channels;

PREFERRED EMBODIMENTS OF THE INVENTION

Preferred embodiments of the present invention will now be described with reference to the drawings.

The array waveguide grating according to the first aspect of the present invention, comprises the first slab waveguide connecting one end of the first channel waveguides and one end of channel waveguide array via the first shape waveguide part and the second slab waveguide connecting one end of the second channel waveguides and the other end of the channel waveguide array via the second shape waveguide part. The first channel waveguides may be for the input or the output. As a further alternative, a plurality of waveguides at the same locality may be partly for the input, while the remainder is for the output. Where the first channel waveguides are sole channel waveguides for the input, the second channel waveguides serve for the output. Where the first channel waveguide are for the output, the remainder is for the input.

In this aspect, at least the open part of each of the first channel waveguides on the side of the first slab waveguide or the open part of each of the second channel waveguides on the side of the second slab waveguide flares in an exponential function shape toward the channel waveguide array. In other words, both or either one of the first and second shape waveguide parts may have the shape flaring in the exponential function shape. Either the first or the second shape waveguide part may consist of a plurality of waveguide parts in correspondence to the channel of each channel waveguide. In the case of the present invention of the first aspect, it is not covered that only part of such waveguide part connected to a slab waveguide has a shape part flaring in the exponential function shape. Several examples of this embodiment will be described in the following.

Figure 1:
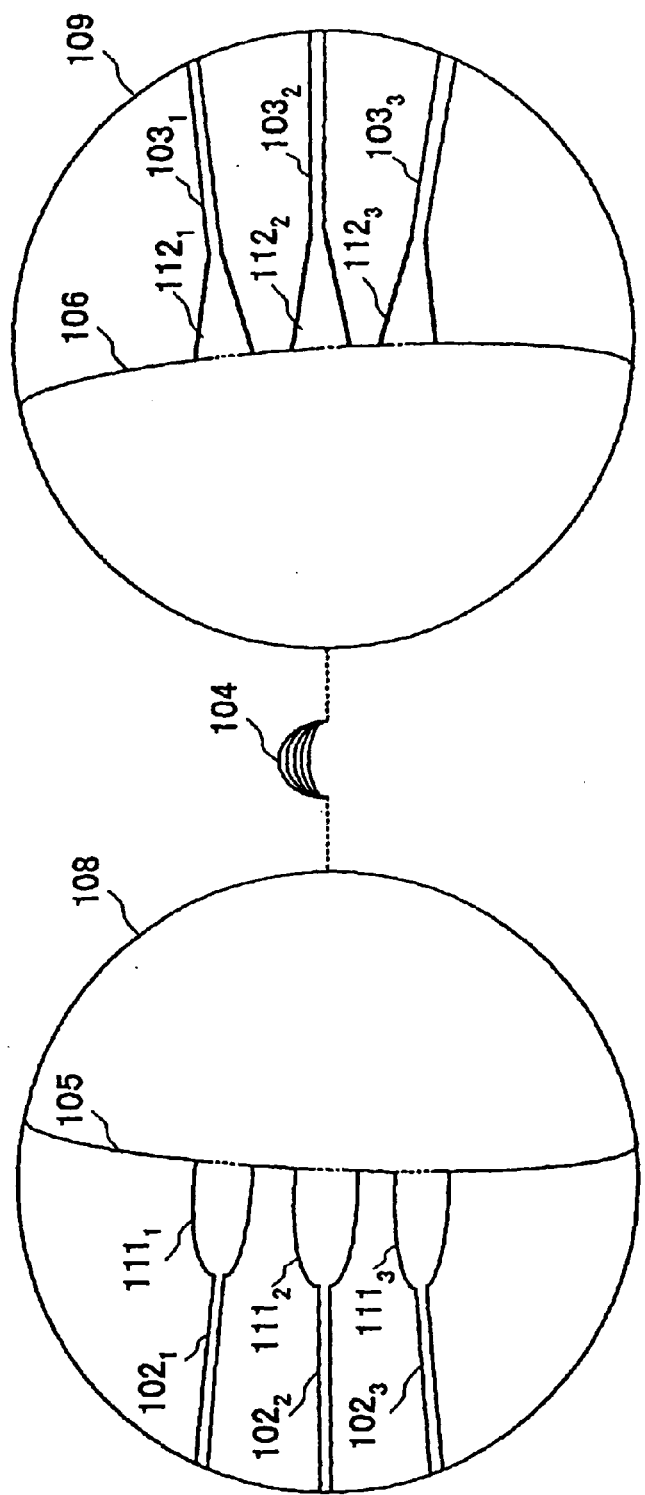
FIG. 1 shows a first example of the array waveguide grating according to the first aspect of the present invention.

FIG. 1 shows a first example of the relation between first boundary part 108 corresponding to the first boundary part 18 shown in FIG. 33 and a second boundary part 109 corresponding to the second boundary part 19. A first and a second sector-shape slab waveguide 105 and 106 constituting the boundary parts 108 and 109 are connected via a channel waveguide array 104 to each other. In this example, a first to a third exponential function shape optical waveguide $111_1$ to $111_3$ having an exponential function shape are provided in the connecting parts between the first to third first channel waveguides $102_1$ to $102_3$ and the first sector-shape slab waveguide 105. On the other hand, a first to a third taper shape optical waveguide $112_1$ to $112_3$ are disposed between the first to third second channel waveguides $103_1$ to $103_3$ and the second sector-shape slab waveguide 106.

Figure 2:
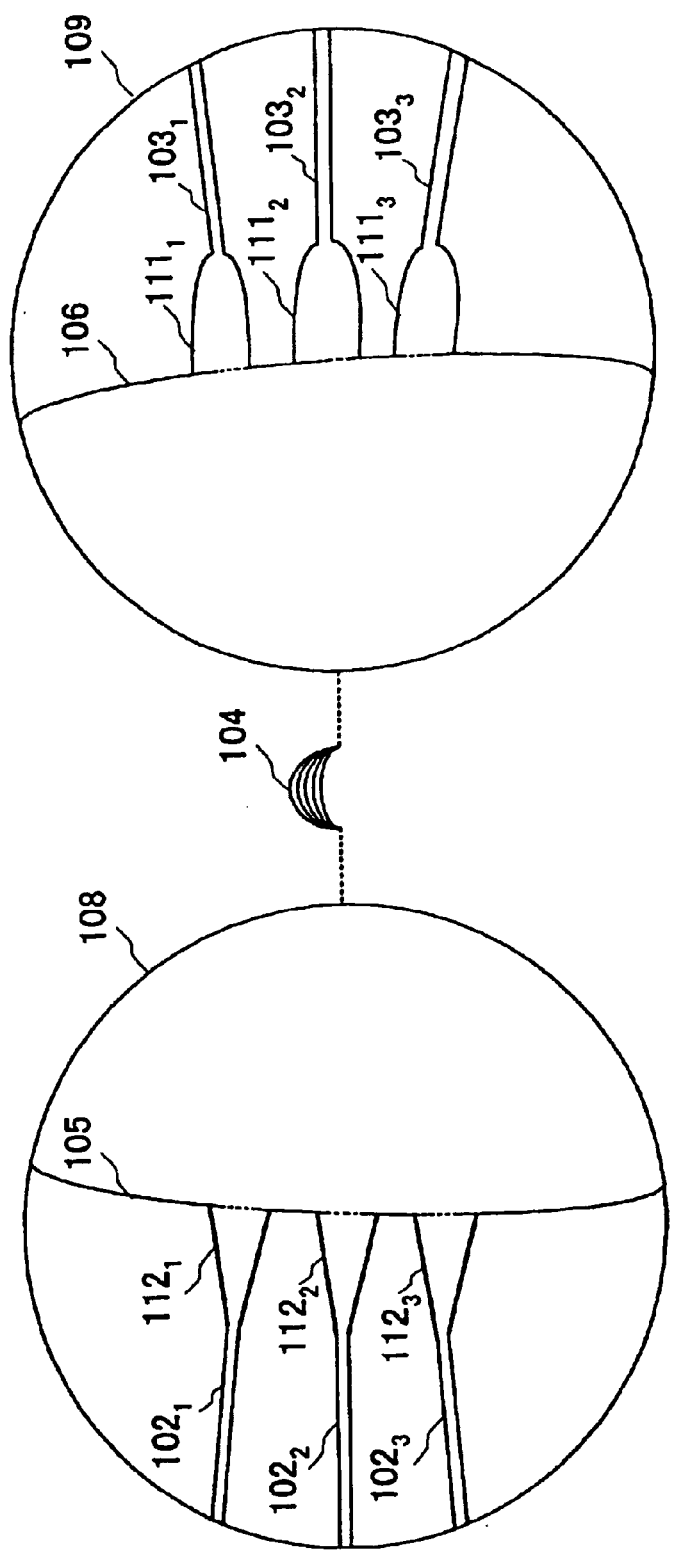
FIG. 2 shows a first example of the array waveguide grating according to the second aspect of the present invention.

FIG. 2 shows a second relation example corresponding to the first aspect. In this example, the first to third exponential function shape optical waveguides $111_1$ to $111_3$ and the first to third taper shape optical waveguides $112_1$ to $112_3$ are disposed conversely to those in the first example. More specifically, the first to third taper shape optical waveguides $112_1$ to $112_3$ constituting the first boundary part 108 are disposed in the connecting part between the first to third channel waveguides $102_1$ to $102_3$ and the first sector-shape slab waveguide 105, while the first to third exponential function shape optical waveguides $111_1$ to $111_3$ are disposed in the connecting parts between the first to third second channel waveguides $103_1$ to $103_3$ constituting the second boundary part 109 and the second sector-shape slab waveguide 106.

Figure 3:
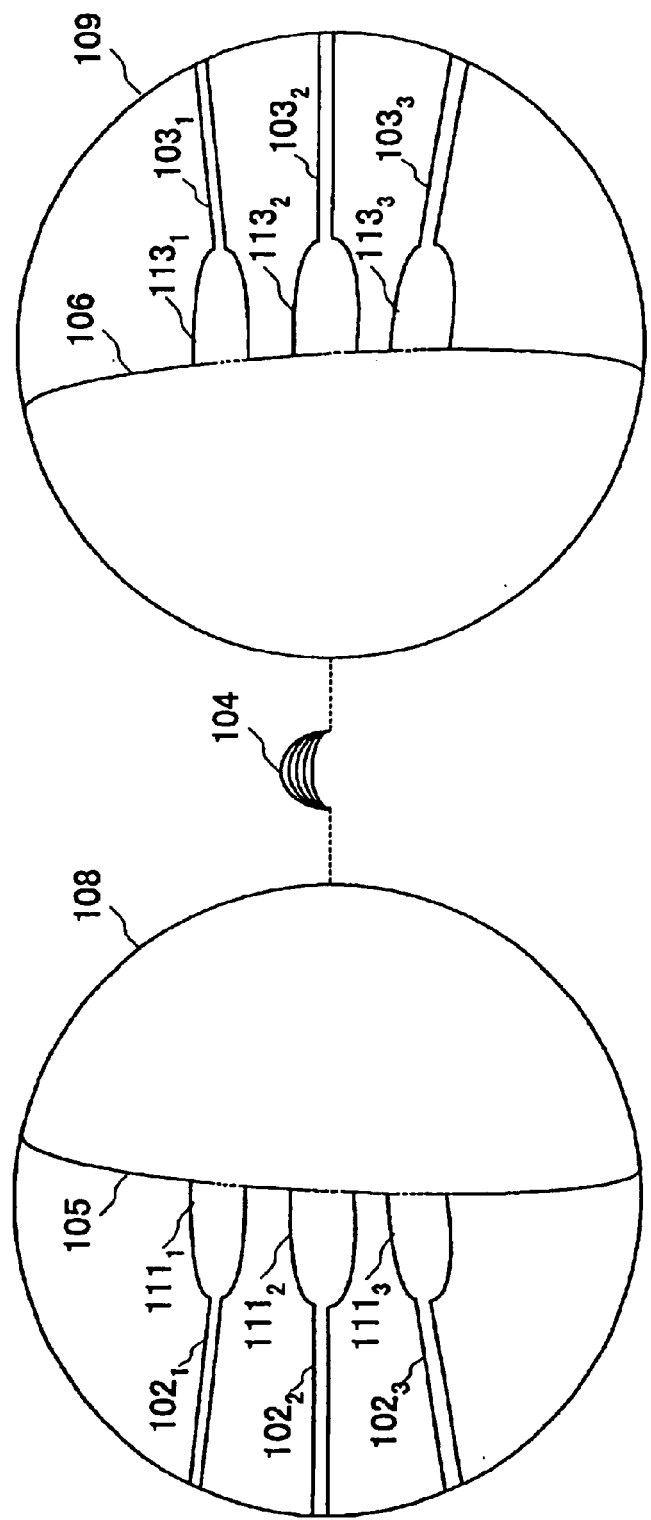
FIG. 3 shows a first example of the array waveguide grating according to the third aspect of the present invention.

FIG. 3 shows a third relation example corresponding to the first aspect. This example is the same in structure as the first example shown in FIG. 1. In this example, a first to a third second degree function shape optical waveguide $113_1$ to $113_3$ are disposed in lieu of the first to third taper shape light waveguides $112_1$ to $112_3$ in the second boundary part 109. As a converse structure to the third example, it is of course possible to dispose the first to third second degree function shape optical waveguides $113_1$ to $113_3$ in the first boundary part 108 and dispose the first to third exponential function shape optical waveguides $111_1$ to $111_3$ in the second boundary part 109.

Figure 4:
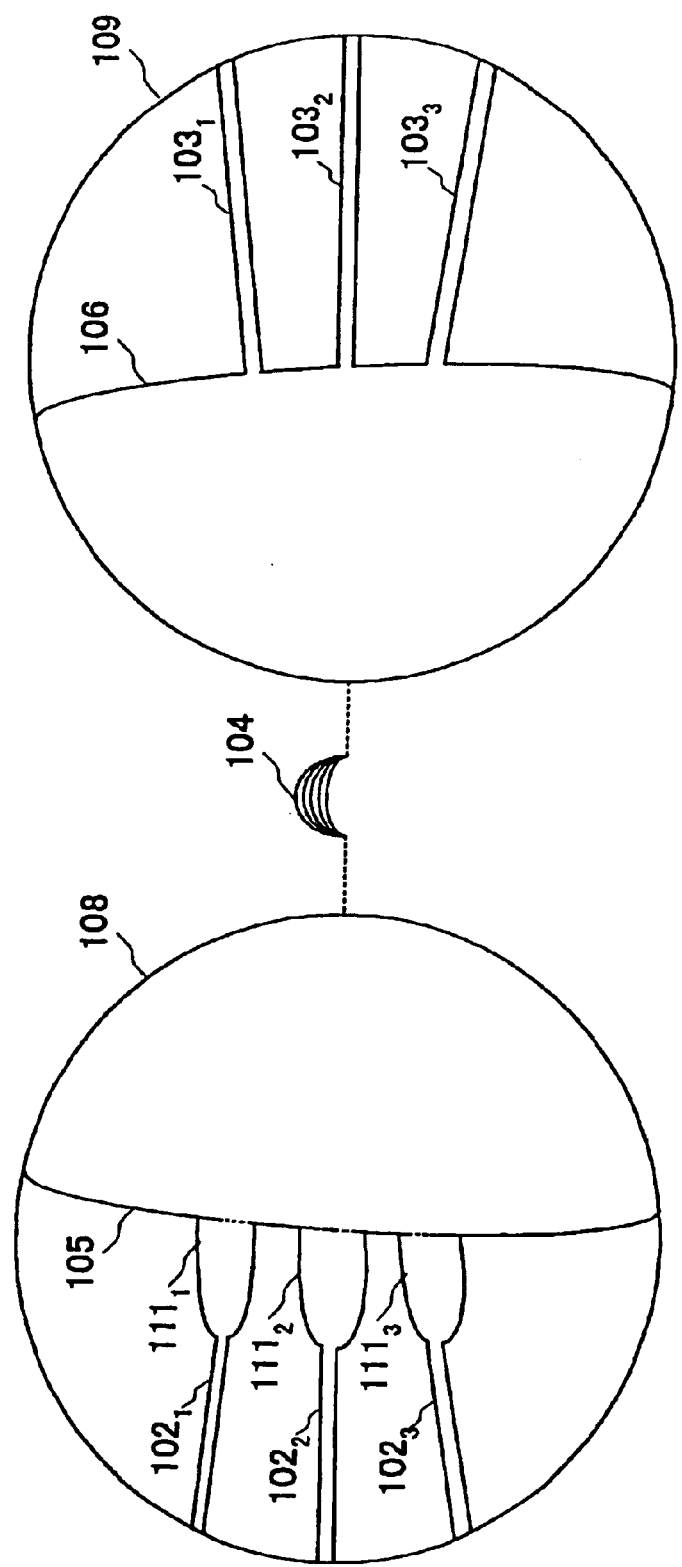
FIG. 4 shows a first example of the array waveguide grating according to the fourth aspect of the present invention.

FIG. 4 shows a fourth relation example corresponding to the first aspect. In this example the first boundary part 108 is the same in structure as that in the first example shown in FIG. 1. In the second boundary part 109, on the other hand, the first to third second channel waveguides $103_1$ to $103_3$ directly terminate in the second sector-shape slab waveguide 106. This arrangement can be considered such that the first to third taper shape optical waveguides $112_1$ to $112_3$ shown FIG. 1 have an inclination angle of 0 degree with respect to the second channel waveguides $103_1$ to $103_3$. As a converse structure to the fourth example, it is of course possible that first to third first channel waveguides $102_1$ to $102_3$ in the first boundary part 108 directly terminate in the first sector-shape slab waveguide 105 while disposing the first to third exponential function shape optical waveguides $111_1$ to $111_3$ in the second boundary part 109.

Unlike the above arrangement, both the first and second shape waveguide parts may have the shape portion flaring in the exponential function shape toward the channel waveguide array. This example will be described in connection with the fifth aspect. The difference of the optical waveguide having the exponential function shape such as the first to third and so forth exponential function shape optical waveguides $111_1$ to $111_3$ from the rectangular or second degree function shape optical waveguide will be described later in detail.

The second aspect is different from the first aspect in that at least part of the open part of each first channel waveguide on the side of the first slab waveguide and the open part of each second channel waveguide on the side of the second slab waveguide has a shape part flaring in an exponential function shape toward the channel waveguide array. That is, according to the second aspect the scope of application of the exponential function shape is broader than according to the first aspect. In the first place, where a plurality of waveguide parts are connected to a slab waveguide, only some of the waveguide parts may have the exponential function shape flaring shape part. This means that a waveguide part without having any exponential function shape flaring shape part may be present. Where a waveguide part of a channel waveguide corresponding to a particular channel may have the exponential function shape flaring shape part, it is not forbidden that this waveguide part has any other shape part. In other words, a certain waveguide may consist of a sole exponential function shape flaring part or of a combination of an exponential function shape flaring shape part and any other shape part. Also, where a waveguide part consists of a combination of a plurality of different shape parts, the total length of the waveguide part may be increased in dependence on the shape combination. As a further alternative, a plurality of shape parts may be present such as to divide a predetermined length. Some examples concerning the shape combination according to the second aspect will be given hereinunder.

Figure 5:
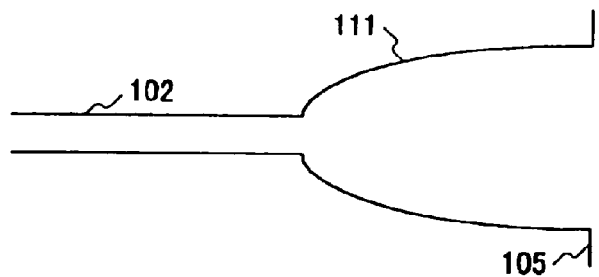
FIG. 5 shows an optical waveguide with exponential shape according to the first aspect of the present invention.

FIG. 5 shows, in the first place, a connection state like that according to the first aspect. In this case, a sole exponential function shape optical waveguide 111 is connected between first channel waveguide 102 and first sector-shape slab waveguide 105. The state of connection between second channel waveguide 103 and second sector-shape slab waveguide 106 (see FIG. 1) is alike, and its description is thus not given. The same omission of description is done in the following.

Figure 6:
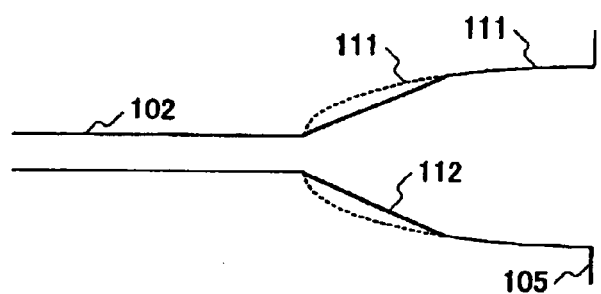
FIG. 6 shows a first example of the optical waveguide according to the second aspect of the present invention.

FIG. 6 shows a first example of the connection state corresponding to the second aspect. In this example, a taper shape optical waveguide 112 and an exponential function shape optical waveguide 111 are inserted in the mentioned order between first channel waveguide 102 and first sector-shape slab waveguide 105.

Figure 7:
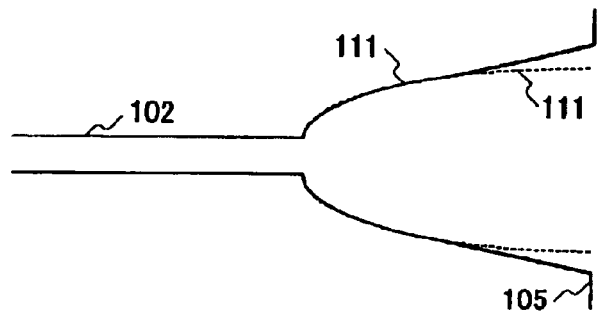
FIG. 7 shows a second example of the optical waveguide according to the second aspect of the present invention.

FIG. 7 shows a second connecting part example corresponding to the second aspect. In this example, an exponential function shape optical waveguide 111 and a taper shape optical waveguide 112 are inserted in the mentioned order between first channel waveguide 102 and first sector-shape slab waveguide 105.

Figure 8:
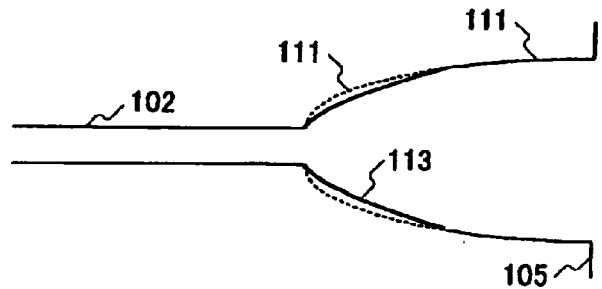
FIG. 8 shows a third example of the optical waveguide according to the second aspect of the present invention.

FIG. 8 shows a third connecting part example corresponding to the second aspect. In this example, a second degree function shape optical waveguide 113 and an exponential function shape optical waveguide 111 are inserted in the mentioned order between first channel waveguide 102 and first sector-shape slab waveguide 105. Although not shown, other structures such as a converse structure that the exponential function shape optical waveguide 111 and the second degree function shape optical waveguide 113 are inserted in the mentioned order between the first channel waveguide 102 and the first sector-shape slab waveguide 105, are of course conversed by the second aspect.

FIGS. 9 to 13 show further connecting part examples, in which, unlike the above examples, a waveguide part of a first or a second other shape than the exponential function shape is provided before or after an exponential function shape optical waveguide. In these examples, the total length of the waveguide parts varies in dependence on the combination status. In the following description, it is assumed that the length L2 of the exponential function shape optical waveguide 111 shown in FIG. 5 is present within a rectangle determined by width Wp and length L2.

Figure 9:
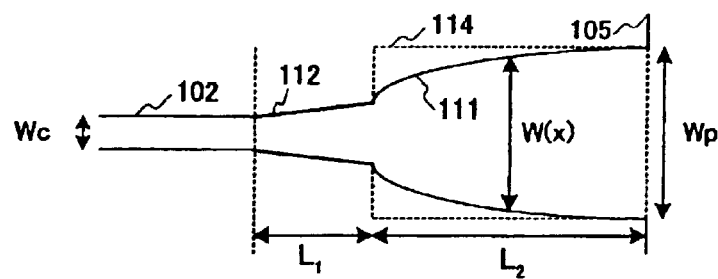
FIG. 9 shows a fourth example of the optical waveguide according to the second aspect of the present invention.

FIG. 9 shows a fourth connecting part example corresponding to the second aspect. In this case, a taper shape optical waveguide 112 with length L1 is present in front of the exponential function shape waveguide 111. More specifically, the taper shape optical waveguide 112 and the exponential function shape optical waveguide 111 are disposed in the mentioned order between, for instance, first channel waveguide 102 and first sector-shape slab waveguide 105. The total length of the connecting part is substantially equal to the sum of L1 and L2. Stringently, the length of the exponential function shape light waveguide 111 is slightly smaller than L2 because the end of the exponential function shape optical waveguide 111 is in contact with a slightly open part of the taper shape optical waveguide 112. In the Figure, reference symbol Wc designates a core width of the first channel waveguide 102, and symbol Wp designates an end width.

Figure 10:
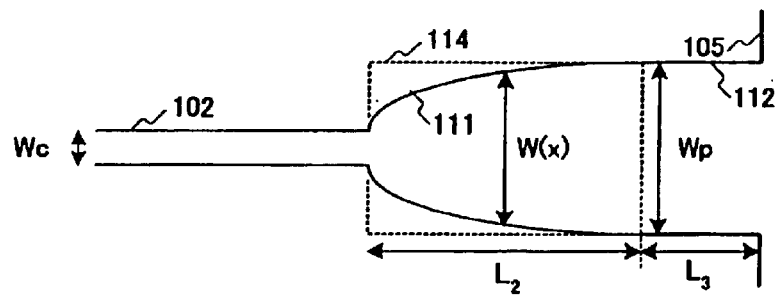
FIG. 10 shows a fifth example of the optical waveguide according to the second aspect of the present invention.

FIG. 10 shows a fifth connecting part example corresponding to the second aspect. In this case, a taper shape optical waveguide with an inclination angle of 0 degree is connected to the trailing end of the exponential function shape optical waveguide. More specifically, the exponential function shape optical waveguide 111 and the taper shape light waveguide 112 with inclination angle of 0 degree are inserted in the mentioned order between, for instance, first channel waveguide 102 and first sector-shape slab waveguide 105. The total length of this connecting part is equal to the sum of L2 and L3.

Figure 11:
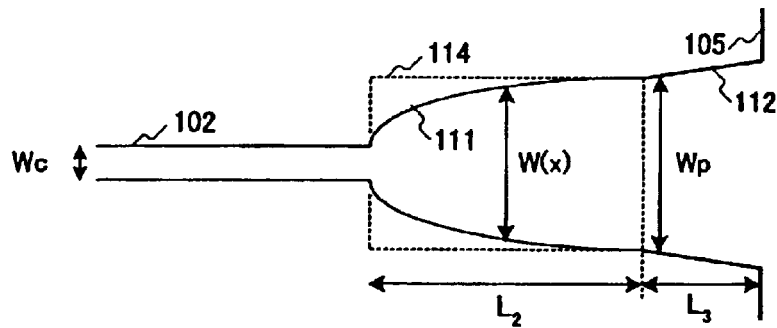
FIG. 11 shows a sixth example of the optical waveguide according to the second aspect of the present invention.

FIG. 11 shows a sixth connecting part example corresponding to the second aspect. This example is the same as the FIG. 10 example except for that a taper shape optical waveguide with an inclination angle other than 0 degree is inserted. Again in this example, the total length of the connecting part is equal to the sum of L2 and L3.

Figure 12:
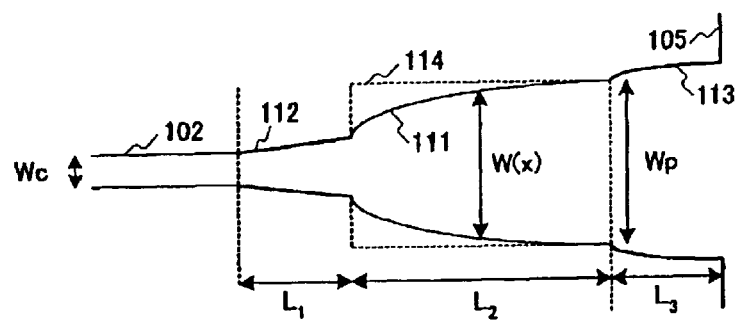
FIG. 12 shows a seventh example of the optical waveguide according to the second aspect of the present invention.

FIG. 12 shows a seventh connecting part example corresponding to the second aspect. In this example, waveguide parts of other shapes than the exponential function shape are inserted before and after the exponential function shape optical waveguide. More specifically, as shown in FIG. 9 the taper shape light waveguide 112 is inserted between the first channel waveguide 102 and the exponential function shape optical waveguide 111, and also a second degree function shape optical waveguide 113 is inserted between the exponential function shape optical waveguide 111 and the first sector-shape slab waveguide 105. Thus, the total length of the connecting part is substantially equal to the sum of the length L1 of the taper shape optical waveguide 112, the intrinsic length L2 of the exponential function optical waveguide 111 and the length L3 of the second degree function shape optical waveguide 113.

Figure 13:
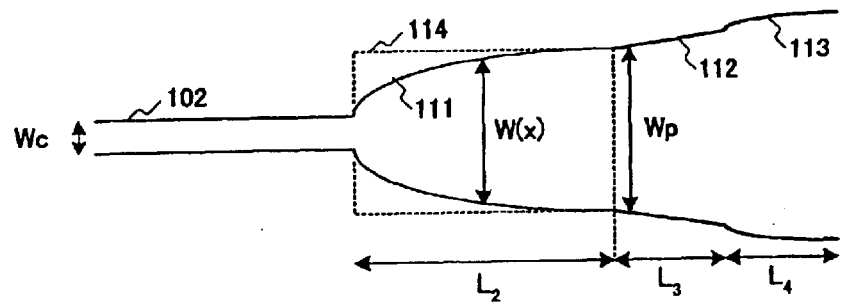
FIG. 13 shows an eighth example of the optical waveguide according to the second aspect of the present invention.

FIG. 13 is an eighth connecting part example corresponding to the second aspect. In this example, waveguide parts of other shapes than the exponential function shape optical waveguide are continuously inserted. More specifically, a taper shape optical waveguide 112 with length L3 and a second channel waveguide 103 with length L4 are inserted in the mentioned order between the exponential function shape optical waveguide 111 and the first sector-shape slab waveguide 105. Of course, it is possible to produce waveguide parts having desired characteristics by many other combinations than those shown before in connection with FIGS. 9 to 13.

According to the third aspect, a shape W(X) flaring in exponential function shape, which is adapted in the array waveguide grating according to the first or second aspect is prescribed. As will be described later, it is possible to preset desired optical frequency characteristics by selecting an appropriate value of shape variable a.

According to the fourth aspect, by setting the shape variable a to be unity or below it is possible to make clearer he features of the exponential function shape. This will be described later. In the case of setting the shape variable to a value greater than unity, merits obtainable according to the invention can be produced although the extents of the merits vary. According to the third aspect, the values of the shape variable a thus include those greater than unity as well.

According to the fifth aspect, it is shown that it is possible to depart from the values of the shape variable a of the shape variable adopted for the first or second shape waveguide part in an array waveguide grating.

Figure 14:
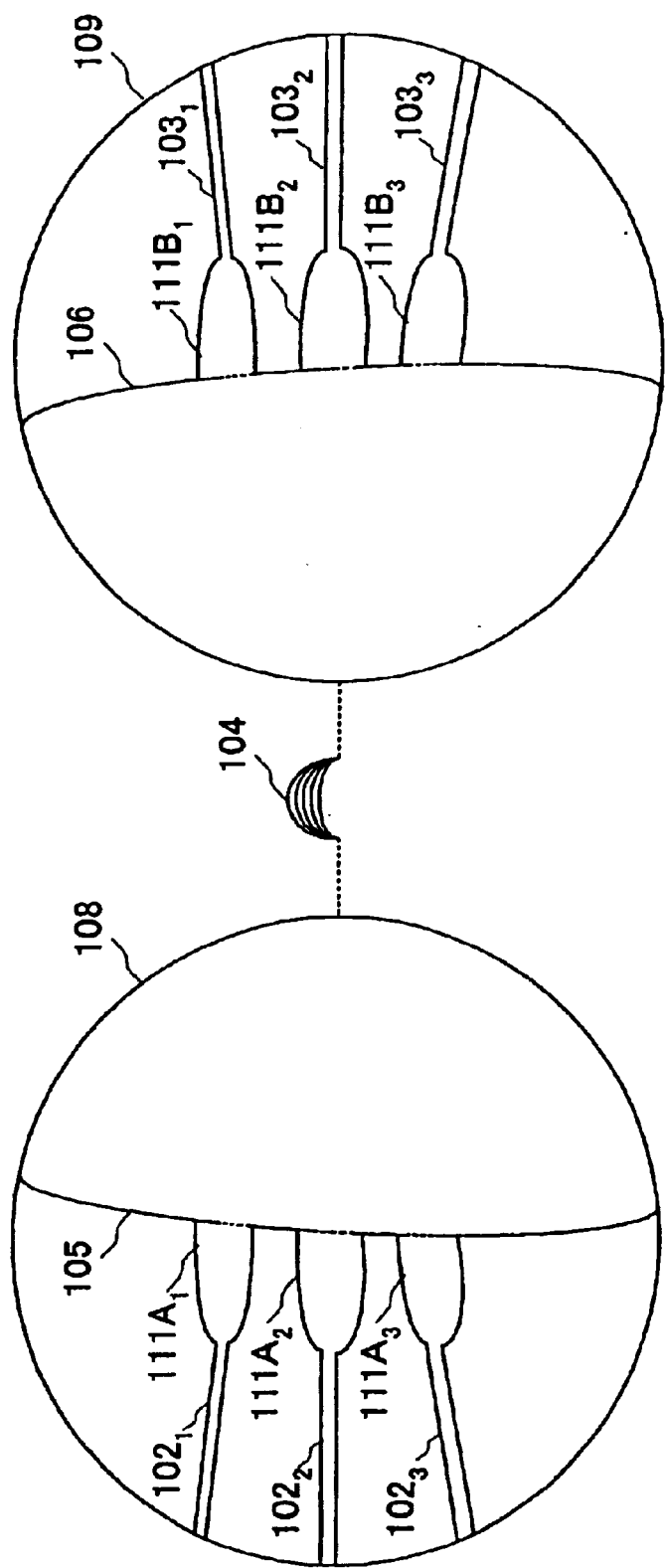
FIG. 14 shows an example of array waveguide grating according to the fifth aspect of the present invention.

FIG. 14 shows an example of array waveguide grating corresponding to the fifth aspect. In this example, exponential function shape optical waveguides used in the two boundary parts are different in shape variable a. In FIG. 14, parts like those in FIG. 1 are designated by like reference numerals and symbols, and their detailed description is appropriately omitted. In the boundary part 108, the first to third first channel waveguides $102_1$ to $102_3$ are connected via the first to third exponential function shape optical waveguides $111A_1$ to $111A_3$ to the first sector-shape slab waveguide 105. In the boundary part 9, the first to third second channel waveguides $103_1$ to $103_3$ are connected to the first to third exponential function shape optical waveguides $111B_1$ to $111B_3$ to the second sector-shape slab waveguide 106. The first to third exponential function shape optical waveguides $111A_1$ to $111A_3$ and the first to third exponential function shape optical waveguides $111B_1$ to $111B_3$ are different in the shape variable 1 from one another.

In the illustrated example, the shape variable a has a greater value in the boundary part 109 than in the boundary part 108. By providing the difference in the shape variable a between the two boundary parts 108 and 109, it is possible to use exponential function shape optical waveguides for both the boundary parts. As a converse example, the shape variable a may have a greater value in the boundary part 108.

According to the sixth aspect, it is shown that where a plurality of waveguide parts each having a shape part flaring in an exponential shape from a channel waveguide toward the channel waveguide array are connected to a sector-shape slab array, the shape variable a of these waveguide parts may be preset independently to adequate values corresponding to these channel waveguides.

Figure 15:
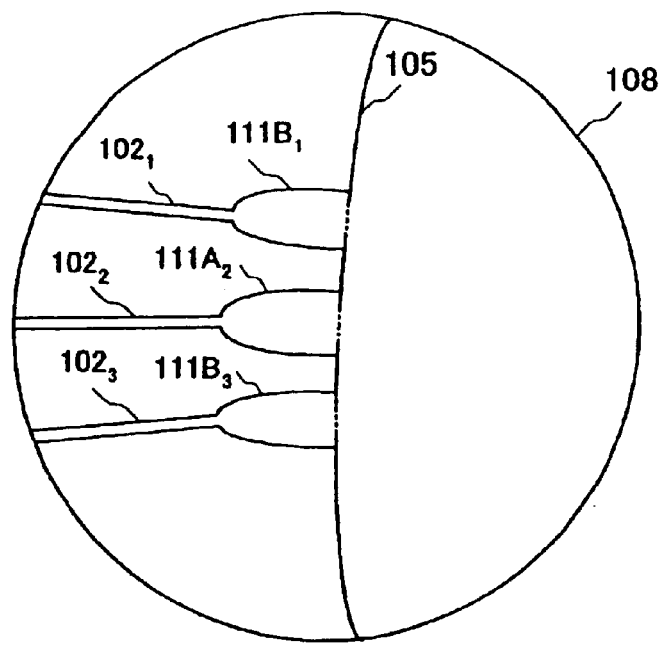
FIG. 15 shows a connecting part of the array waveguide grating according to the sixth aspect of the present invention.

FIG. 15 shows an example of connecting part corresponding to the sixth aspect. In this example of connecting part 108, the first channel waveguide $102_1$ is connected via the first exponential function shape optical waveguide $111B_1$ to the first sector-shape slab waveguide 105. The second first channel waveguide $102_2$ is connected via the second exponential function shape optical waveguide $111A_2$ to the first sector-shape slab waveguide 105. The third first channel waveguide $102_3$ is connected via the third exponential function shape optical waveguide $111B_3$ to the first sector-shape slab waveguide 105. In the first exponential function shape optical waveguide $111B_1$, as described before in connection with FIG. 14, the shape variable a is greater than in the second exponential function shape optical waveguide $111A_1$. Also, in the third exponential function shape optical waveguide $111B_3$ connected to the third first channel waveguide $102_3$, the shape variable a is greater than in the second exponential function shape optical waveguide $111A_1$.

As shown, it is possible to set the value of the shape variable a independently according to the characteristics of the channel waveguides 102 or 103. While in the FIG. 15 example two different values of shape variable a are set, it is also possible to set a maximum number of different value of shape variable a equal to the number of exponential function shape optical waveguides 111.

According to the seventh aspect, the taper shape is provided as an example of the shape of a part in the first and second shape waveguide parts, which does not have any shape part flaring in the exponential function shape.

Figure 16:
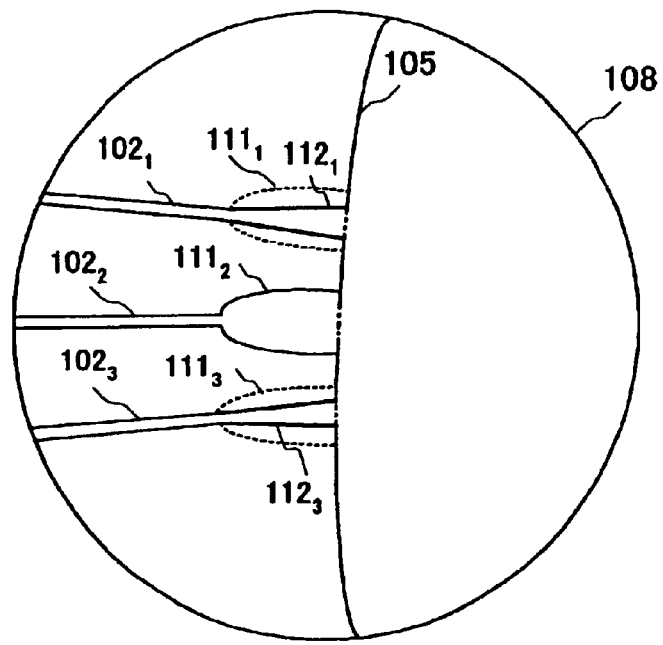
FIG. 16 shows a connecting part of the array waveguide grating according to the seventh aspect of the present invention.

FIG. 16 shows an example corresponding to the seventh aspect. In the boundary part 108, for instance, the second first channel waveguide 102 is connected via the second exponential function shape optical waveguide $111B_2$ to the first sector-shape slab waveguide 105. The remaining first and third channel waveguides $102_1$ and $102_3$ are connected via the first and third tape shape optical waveguides $112_1$ and $112_3$ to the first sector-shape slab waveguide 105.

According to the eighth aspect, the second degree function shape is provided as an example of the shape of a part in the first and second shape waveguide parts, which does not have any shape part faring in the exponential function shape.

Figure 17:
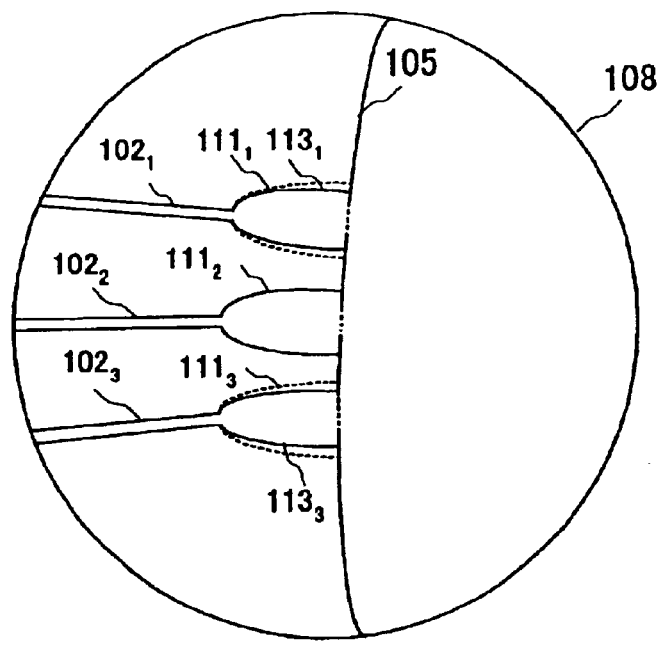
FIG. 17 shows a connecting part of the array waveguide grating according to the eighth aspect of the present invention.

FIG. 17 shows an example corresponding to the eighth aspect. The second exponential function shape optical waveguide $111_2$ having exponential function shape and the second degree function shape optical waveguides $113_1$ and $113_3$ are provided on the opposite sides of the waveguide $111_1$ in the connecting parts between the first to third first channel waveguides $102_1$ to $102_3$ and the first sector-shape slab waveguide 105. Various modifications of this example such as the converse arrangement thereto are possible.

Figure 18:
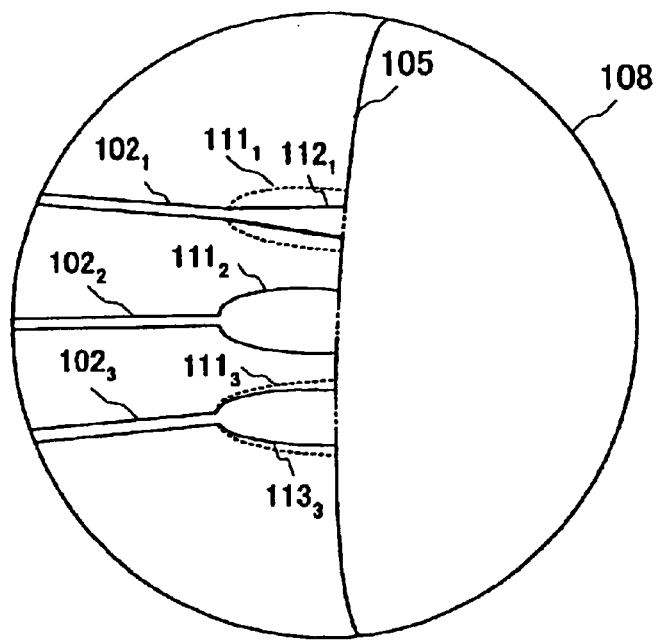
FIG. 18 shows a connecting part of the array waveguide grating according to the ninth aspect of the present invention.

FIG. 18 shows an example corresponding to the ninth aspect. The second exponential function shape optical waveguide $111_2$ is provided in the connecting part between the second first channel waveguide $102_2$ and the first sector-shaped slab waveguide 105. The first taper shape optical waveguide $112_1$ is provided in the uppermost connecting part in the Figure between the first channel waveguide $102_1$ and the first sector-shape slab waveguide 105. The third second degree function shape optical waveguide $113_3$ is provided in the lowermost connecting part in the Figure between the third first channel waveguide $102_3$ and the first sector-shape slab waveguide 105.

While FIG. 18 shows the case where a total of three channel waveguides, i.e., the first to third first channel waveguides $102_1$ to $102_3$ are present, in the case where a greater number of channel waveguides are present, it is possible to select, as desired, the number of optical waveguides, which are each constituted as taper shape optical waveguides 112 as part without any part flaring in an exponential function shape, and also the number of optical waveguides, which are each constituted as second degree function shape optical waveguide 113 as such part. Of course, these arrangements may concern not only the boundary part 108 but also the boundary part 109. Also, one of the optical waveguides may be constituted by the taper shape optical waveguide 112 and the second degree function shape optical waveguide 113 inserted in the mentioned order.

According to the tenth aspect, as shown in FIG. 7, an example of waveguide is provided, in which exponential function shape optical waveguide 111 and taper shape optical waveguide 112 are inserted in the mentioned order between each first channel waveguide 102 and first sector-shape slab waveguide 105. The numbers and arrangement order of exponential function shape optical waveguides 111 and taper shape optical waveguides 112 can be selected as desired.

Figure 19:
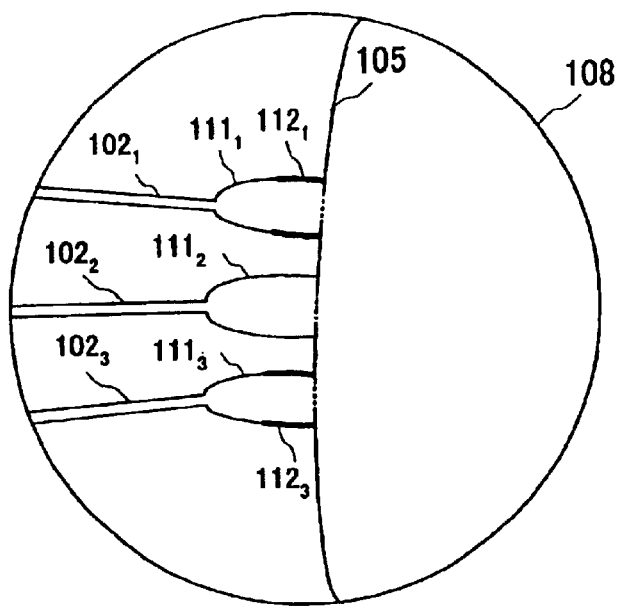
FIG. 19 shows a connecting part of the array waveguide grating according to the tenth aspect of the present invention.

FIG. 19 shows an example corresponding to the tenth aspect. The second exponential function shape optical wave guide $111_2$ having a sole exponential function shape is provided in the connecting part between the second first channel waveguide $102_1$ and the first sector-shape slab waveguide 105. The first exponential function shape optical waveguide $111_1$ and the first taper shape optical waveguide $112_1$ are inserted in the mentioned order in the uppermost connecting part in the Figure between first first channel waveguide $102_1$ and the first sector-shape slab waveguide 105. The third exponential function shape optical waveguide $111_3$ and the third taper shape optical waveguide $112_3$ are inserted in the mentioned order in the lowermost connecting part between the third exponential function shape optical waveguide $111_3$ and the third taper shape optical waveguide $112_3$. Various variations in the insertion order and so forth are of course possible.

According to the eleventh aspect, as shown in FIG. 8, an example of waveguide is provided, in which second degree function shape optical waveguide 113 and exponential function shape optical waveguide 111 are inserted in the mentioned order between each first channel waveguide 102 and the first sector-shape slab waveguide 105. The numbers and arrangement order of the exponential function shape optical waveguides 111 and second degree function shape optical waveguides 113 can be selected as desired.

According to the twelfth aspect, it is shown that an optical waveguide having an exponential function shape flaring shape part may have, as other shape part, not only taper shape part but also second degree function shape part.

Figure 20:
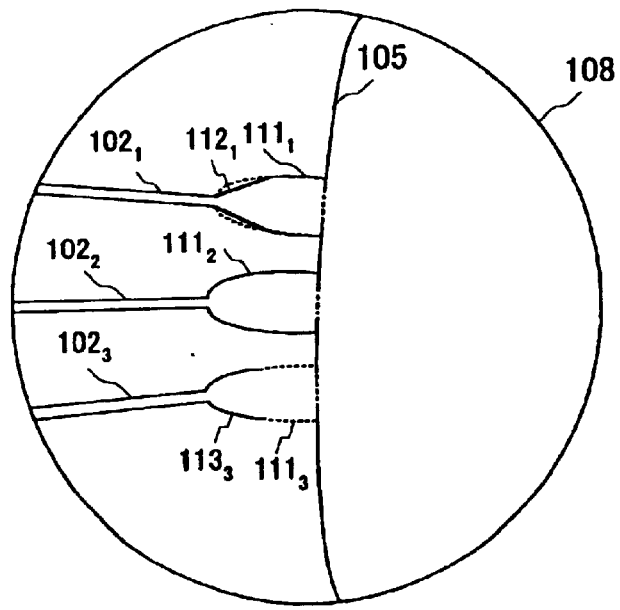
FIG. 20 shows a connecting part of the array waveguide grating according to the fifteenth aspect of the present invention.

FIG. 20 shows an example corresponding to the twelfth aspect. The second exponential function shape optical waveguide $111_2$ having a sole exponential function shape is provided in the connecting part between the second first channel waveguide $102_2$ and the first sector-shape slab waveguide 105. The first taper shape optical waveguide $112_1$ and the first exponential function shape optical waveguide $111_1$ are inserted in the mentioned order in the uppermost connecting part in the Figure between the first first channel waveguide $102_1$ and the first sector-shape slab waveguide 105. The third second degree function shape optical waveguide $113_3$ and the third exponential function shape optical waveguide $111_3$ are inserted in the mentioned order in the lowermost connecting part in the Figure between the third first channel waveguide $102_3$ and the first sector-shape slab waveguide 105. Various variations in the insertion order and so forth are of course possible.

According to the thirteenth aspect, at least either the open part of each of the first waveguides on the side of the first slab waveguides or the open part of each of the second channel waveguides on the side of the second slab waveguide is a shape part flaring in a shape represented by a function of the second or a higher degree. As will be described later, in this case, again in this case the same feature as is obtainable in the case of the exponential function shape flaring shape part can be obtained. Also, again in the case of the thirteenth aspects various variations concerning combinations of other shapes and so forth are possible. However, these variations are essentially like those in the case involving the exponential function shape flaring shape part, and they are not exemplified.

According to the fourteenth aspect, at least either the open part of each of the first channel waveguides on the side of the first slab waveguide or the open part of each of the second channel waveguides on the side of the second slab waveguide has an open end with an opening width greater than the waveguide width of the first or second channel waveguides, and has a curved shape such that its part extending from he stem part toward the open end is on the inner side of rectangular shape of the opening width and on the outer side of a second degree curve connecting the stem part and the open end.

According to the fifteenth aspect, it is featured that in the array waveguide grating as the thirteenth aspect, each flaring shape portion represented by a second or a higher degree function has a convex shape having a characteristic in a region between the boundary regions of the characteristics with respect to the transmission width and the cross-talk as each light wave of multiplexed Gaussian waveform passing through the waveguide thereof passes rectangular waveguide and second degree function shape waveguide. This will be described hereinafter with reference to drawings.

According to the sixteenth aspect, it is shown that array waveguide grating modules in the form of combinations of optical fibers with the array waveguide gratings according to the first aspect.

In the other aspects such as twenty-first to twenty-eighth aspects, FIGS. 14 to 20 should be referred. Other aspects will be understood from the foregoing and following description of the present invention.

Now, preferred embodiments of the present invention will be described with reference to the drawings.

Figure 21:
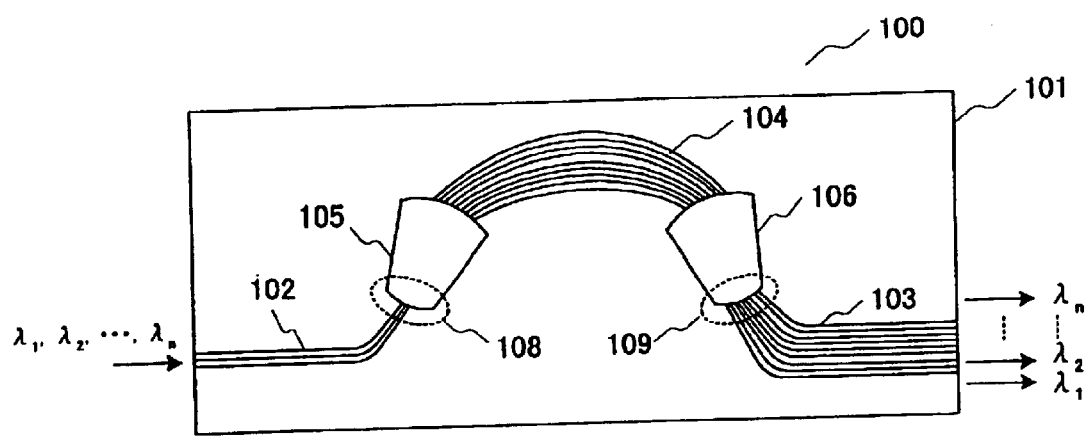
FIG. 21 shows the construction of a first embodiment of the array waveguide grating according to the present invention.

FIG. 21 shows the construction of a first embodiment of the array waveguide grating according to the present invention. The illustrated array waveguide grating 100 has a substrate 101, which one or more first channel waveguides 102, a plurality of second channel waveguide 103, a channel waveguide array 104 with a plurality of component channel waveguides bent in a predetermined direction with different radii of curvature, a first sector-shape slab waveguide 104 connecting the first channel waveguides 102 and the channel waveguide array 104 to one another and a second sector-shape slab waveguide 106 connecting the channel waveguide array 104 and the second channel waveguides 103 to one another, are formed on. Multiplexed light signals with wavelengths $\lambda_1$ to $\lambda_n$ are incident from the first channel waveguide 102, then proceed with their paths expanded therethrough and are then incident on the channel waveguide array 104.

In the channel waveguide array 104, the component array waveguides have progressively increasing or reducing optical path lengths with a predetermined optical path length difference provided between adjacent ones of them. Thus, the light beams proceeding through the individual array waveguide reach the second sector-shape slab waveguide 106 with a predetermined phase difference provided between adjacent ones of them. Actually, wavelength dispersion takes place, and in-phase plane is inclined in dependence on the wavelength. Consequently, the light beams are focused (i.e., converged) on the boundary surface between the second sector-shape slab waveguide 106 and the plurality of second channel waveguide 103 at positions different with wavelengths. The second channel waveguides 103 are disposed at positions corresponding to their respective wavelengths. Given wavelength components $\lambda_1$ to $\lambda_n$ thus can be taken out independently from the second channel waveguides 103.

The structure of this embodiment of the array waveguide grating 100 will now be described specifically. In this embodiment, a semiconductor (i.e., silicon) substrate is used as the substrate 101. Of course, the semiconductor is by no means limitative as the material of the substrate 101. In this embodiment, the substrate 101 is formed by using a quartz-based material doped with phosphorus, germanium, titanium, boron, fluorine, etc. for a lower clad layer, which is deposited to a thickness of several ten micrometers by using such method as fire deposition method, normal pressure CVD (Chemical Vapor Deposition) method, spattering method, spin coating method and electron beam deposition method. On this layer, a core layer having an optical waveguide shape as shown in FIG. 21 is formed.

In the core layer formation, fine areas are transferred to an adequate mask material by using litho-photography. Then, unnecessary areas are removed by a dry etching method using an RIE (Reactive Ion Etching) device or an RIBE (Reactive Ion Beam Etching) device. Finally, an upper clad layer about several ten micrometers thick is deposited by using again the above quartz material with a refractive index preset to be higher than that of the core layer.

Figure 22:
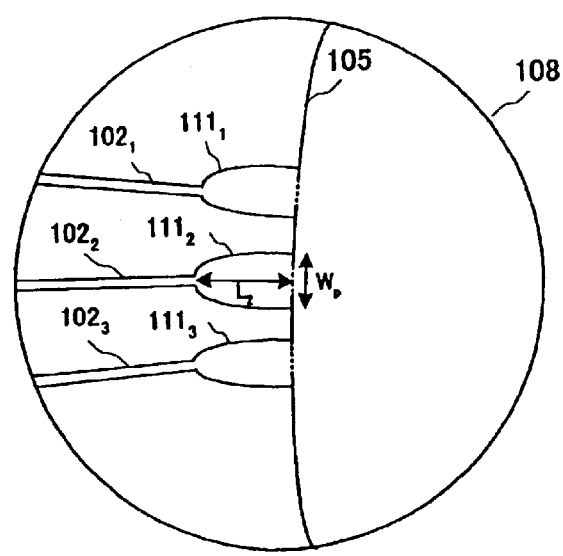
FIG. 22 shows the core shapes of the first channel waveguide and the first sector-shape slab waveguide in the boundary part shown in FIG. 21.

FIG. 22 shows the core shapes of the first channel waveguide 102 and the first sector-shape slab waveguide 105 in the boundary part 108 shown in FIG. 21. For the sake of the brevity of illustration, it is assumed that the first channel waveguide 102 shown in FIG. 21 is constituted by three channel waveguides, i.e., the first to third first channel waveguides $102_1$ to $102_3$. The first to third first channel waveguides $102_1$ to $102_3$ are connected via the first to third exponential function shape optical waveguides $111_1$ to $111_3$ having a corresponding exponential function shape to the first sector-shape slab waveguide 105.

Figure 23:
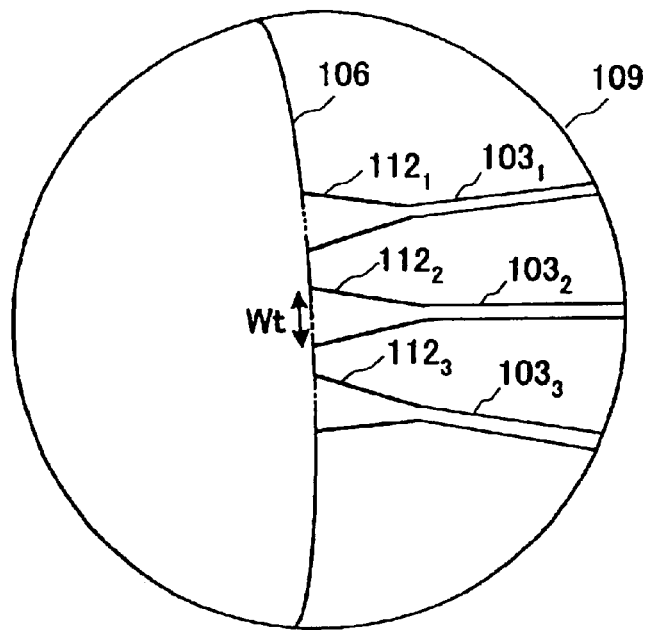
FIG. 23 shows the core shapes of the second channel waveguide and the second sector-shape slab waveguide in the boundary part shown in FIG. 21.

FIG. 23 shows the core shapes of the second channel waveguide 103 and the second sector-shape slab waveguide 106 in the boundary part 109 shown in FIG. 21. Again in this Figure, for the sake of the brevity of illustration, the second channel waveguide 103 shown in FIG. 21 is constituted by three channel waveguides, i.e., the first to third second channel waveguides $103_1$ to $103_3$. The first to third second channel waveguides $103_1$ to $103_3$ are connected via the first to third taper shape optical waveguides $112_1$ to $112_3$ having a corresponding taper shape to the second sector-shape slab waveguide 106.

The shape of the cores of the boundary part between the first sector-shape slab waveguide 105 and the channel waveguide array 104, and between the first sector-shape slab waveguide 105 and the second sector-shape slab waveguide, 106 as shown in FIG. 21 is a taper shape as shown in FIG. 23. The shape of these parts, however, have no direct bearing on the optical frequency characteristic, and is thus outside the subject of consideration according to the present invention. According to the present invention, optical frequency characteristics of the first and second boundary parts 108 and 109, i.e., the optical frequency characteristics of the connecting part between the channel waveguide 102 and the sector-shape slab waveguide 105 and the connecting part between the channel waveguide 103 and the sector-shape slab waveguide 106 based on the shapes of the optical waveguides, are considered. By the way, light beams incident on the first channel waveguides 102 on the substrate 101 shown in FIG. 21, are changed from basic mode to harmonic mode as it passes through the exponential function shape optical waveguides 111. As a result, the electric field distribution is converted from Gaussian distribution to a specially flat electric field distribution. The spread of this electric field distribution is determined by an optical waveguide shape, which is represented by optical waveguide width W(X) given by the following equation (1).

$$W(X)=(Wp-Wc)*(1-\exp(-a*X))+Wc \qquad (1)$$

where symbol X represents the progress direction of the light waves, symbol a represents the shape variable giving the shape of the exponential function, and symbol Wc the core width of the channel waveguide. Symbol Wp represents the end with of connection of the exponential function shape optical waveguide 111 to the first sector-shape slab waveguide 105 as shown in FIG. 22.

When light beams having such electric field distribution are incident on the first sector-shape slab waveguide 105 shown in FIG. 21 after passing through the exponential function shape optical waveguides 111, their paths are expanded in directions perpendicular to the optical axis. The light beams then excite the component waveguides of the channel waveguide array 104, and are converged in the second sector-shape slab waveguide 103 at positions of the second channel waveguides 103 corresponding to their optical frequencies f. In this way, light beams of desired wavelength components $\lambda_1$ to $\lambda_n$ are taken out from the individual second channel waveguides 103.

The core opening width Wt of the second channel waveguides 103 shown in FIG. 23 are designed to be less than the above spacially flat electric field distribution width. Thus, the quantity of light coupled to the second channel waveguides 103 is substantially fixed irrespective of slight changes in the optical frequency f of a light source (not shown). It is thus possible to obtain flat optical frequency characteristics, with which the split light beam output is substantially fixed irrespective of changes in the optical frequency f of the light source.

Figure 24:
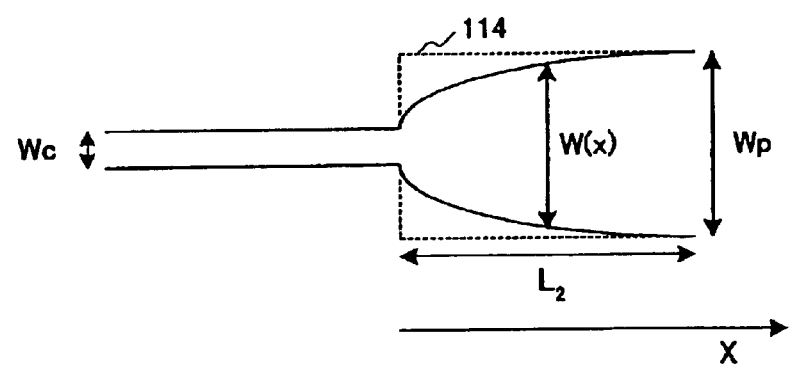
FIG. 24 is an enlarged-scale showing of an exponential function shape optical waveguide shown in FIG. 22.

FIG. 24 is an enlarged-scale showing of an exponential function shape optical waveguide shown in FIG. 22. The parameters in the previous equation (1) are shown in the Figure. As shown in the Figure, the length of the exponential function shape optical waveguide 111 in the direction X of the light wave progress is designated by L2. The dashed line shows, for the sake of reference, a rectangular optical waveguide 114, which is determined by width Wp and length L2.

Figure 25:
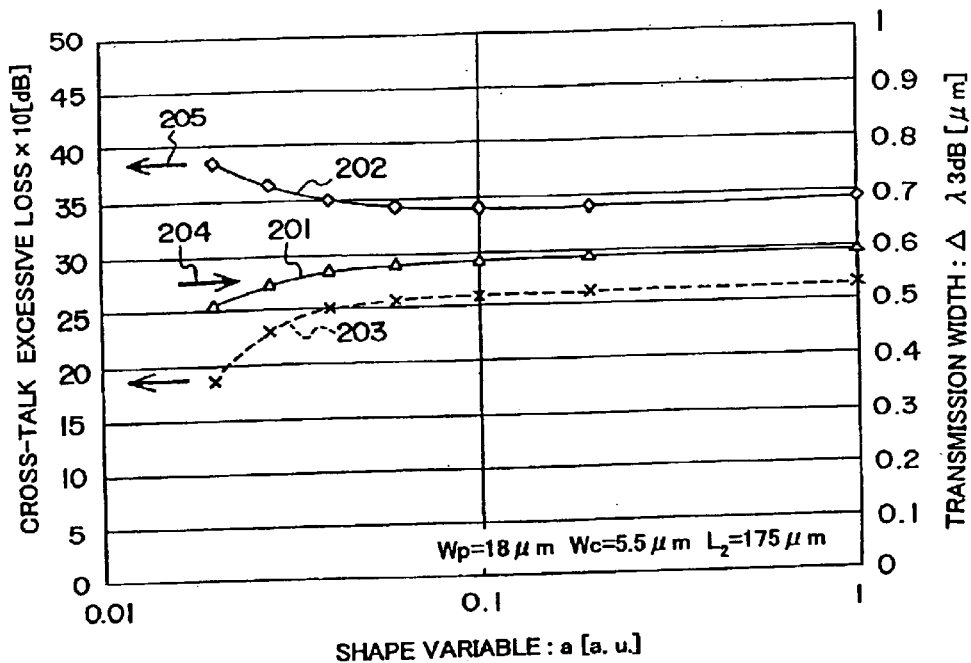
FIG. 25 shows changes in the cross-talk, loss and transmission width obtained by increasing the value of the shape variable a of the exponential function shape optical waveguides shown in FIG. 22.

FIG. 25 shows changes in the cross-talk, loss and transmission width obtained by increasing the value of the shape variable a of the exponential function shape optical waveguides shown in FIG. 22 from 0.01. These characteristic curves correspond to a case with a width Wp of 18 $\mu$m, a waveguide part spread Wc of 5.5 $\mu$m and a length L2 of 175 $\mu$m. The broader the transmission width is, it is the better, and the greater the absolute value is, it is the better. Thus, the upper positions the transmission width curve 201 and the cross-talk absolute value curve 202 are in, the results are the better. Excess loss is shown by curve 203.

As described before in connection with the prior art, the transmission width and the cross-talk are in the trade-off relation to each other. More specifically, to increase the transmission width represented by the curve 201 the value of the shape variable a has to be increased as shown by arrow 204. Also, to increase the cross-talk absolute value represented by the curve 202 the value of the shape variable a has to be reduced as shown by arrow 205. However, both the characteristic curves undergo only slight changes with increase of the value of the shape variable a beyond 0.1, and are hardly changed with a value of the shape variable a greater than unity. Accordingly, the value of the shape variable a can be limited to be unity or below without any practical trouble in considerations.

Figure 26:
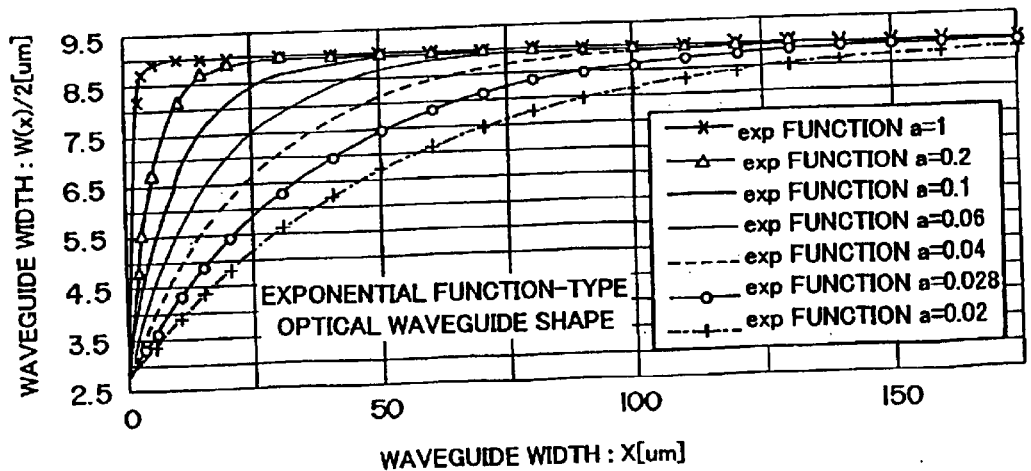
FIG. 26 shows changes in the shape of the exponential function shape waveguide shown in FIG. 24 with changes in the value of the shape variable a in the equation (1)

FIG. 26 shows changes in the shape of the exponential function shape waveguide shown in FIG. 24 with changes in the value of the shape variable a in the equation (1). Here, a case with the shape variable a less than unity is considered for the ground described before. More specifically, the shape variable a is changed from unity to 0.02. When the shape variable a is unity, it is possible to obtain a result close to the rectangular shape optical waveguide 114 and thus obtain a maximum transmission width as shown in FIG. 25. By reducing the shape variable an absolute value of the cross-talk is increased. The closer the value of the shape variable a is to zero, the closer is the characteristic to that of the second degree shape optical waveguide 113 (see FIG. 3).

From FIG. 26, it will be seen that with the exponential function shape optical waveguide 111 it is possible to obtain a characteristic, which is superior to that of the second degree function shape optical waveguide 113 to an extent that the waveguide 111 is closer in characteristic to the rectangular shape optical waveguide 114. Also, it will be seen that the degree of freedom of the characteristic choice is high owing to the possibility of varying the value of the shape variable a.

Figure 27:
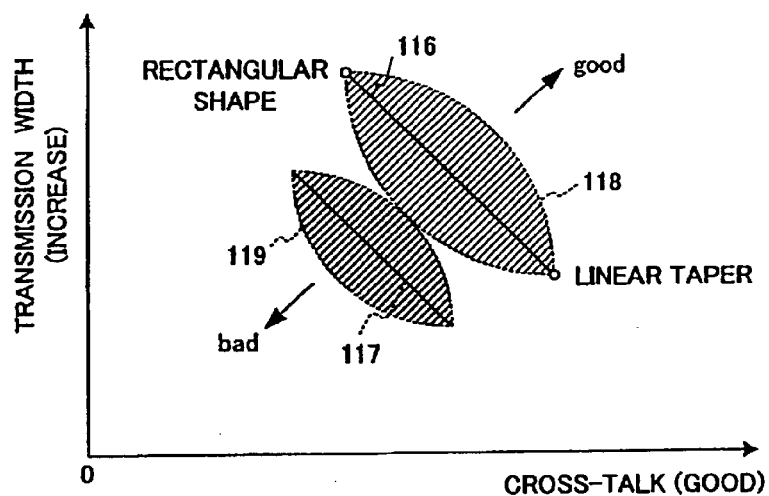
FIG. 27 conceptionally shows the difference between the characteristics of the exponential function shape optical waveguide according to the present invention and the prior art second degree function shape optical waveguide.

FIG. 27 conceptionally shows the difference between the characteristics of the exponential function shape optical waveguide according to the present invention and the prior art second degree function shape optical waveguide. In the Figure, the ordinate is taken for the transmission width, and the abscissa is taken for cross-talk in absolute value. The greater the both values are, the state is the better, and the closer the two values to the origin (i.e., zero), the state is the worse. Straight line 116 shows an example of the exponential function shape optical waveguide, and broken line 117 shows an example of the second degree function shape optical waveguide. These characteristics vary in dependence on the values of the shape variable, and they are specified to be within the ranges enclosed in dashed loops 118 and 119. The exponential function shape optical waveguide becomes infinitely closer to a rectangle as the shape variable a becomes infinity. On the other hand, the waveguide assumes a linear taper shape when the variable a becomes zero. The exponential function shape optical waveguide also is in contact with the second degree function shape optical waveguide in dependence on the value of the shape variable. However, as is obvious from FIG. 27, outside the part where the two optical waveguides are in contact, the exponential function shape optical waveguide is always characteristically superior in both the transmission width and the absolute value of the cross-talk to the second degree function shape optical waveguide.

Figure 28:
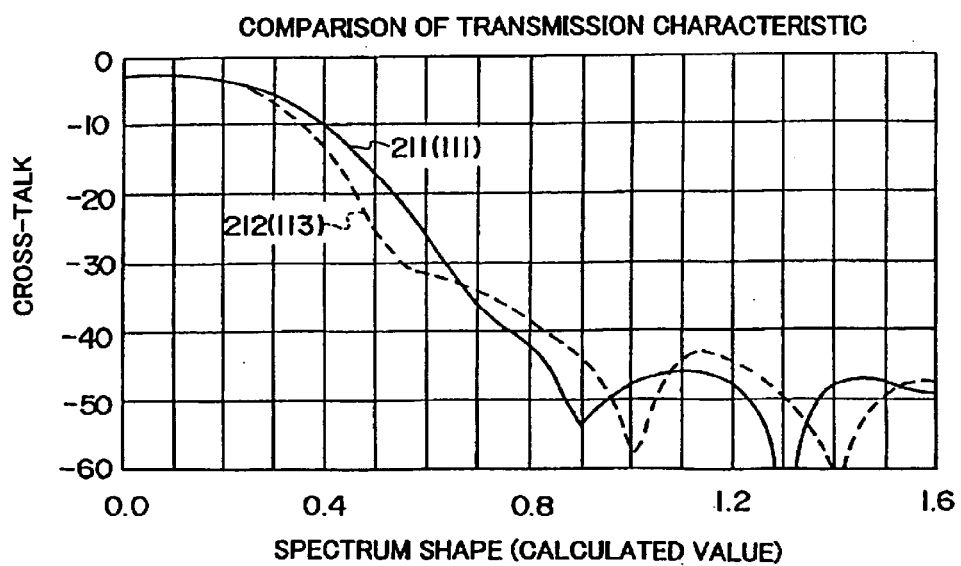
FIG. 28 is a drawing of compared result of an array waveguide grating using exponential function shape optical waveguides according to the present invention and a prior art array waveguide grating using second degree function shape optical waveguides in the spectral shape and the transmission width.

FIG. 28 is a drawing of compared result of an array waveguide grating using exponential function shape optical waveguides according to the present invention and a prior art array waveguide grating using second degree function shape optical waveguides in the spectral shape and the transmission width. In the Figure, solid plot 211 represents the result of measurements with the exponential function shape optical waveguides 111 shown in, for instance, FIG. 113, and dashed plot 212 represents the result of measurements with the second degree function shape optical waveguides 113 shown in, for instance, FIG. 3. The values of the width Wp and so forth are the same as those shown in FIG. 25.

From the Figure it is obvious that the second degree shape optical waveguides 113 shown by the dashed plot 212 has a shaper spectral shape and also has a smaller transmission width than that of the exponential function shape optical waveguide 111 shown by the solid plot 211. In this embodiment, adjacent channels of light signals are present in the neighborhood of 0.8 in the abscissa, and at this position the cross-talk is lower with the second degree function shape optical waveguide 111 than with the exponential function shape optical waveguide 113. That is, with the exponential function shape optical waveguide 111 the influence of the adjacent channel light signals is less. Thus, it will be seen that the exponential function shape optical waveguide 111 is improved in the transmission width and the cross-talk over the second degree function shape optical waveguide 111.

Figure 29:
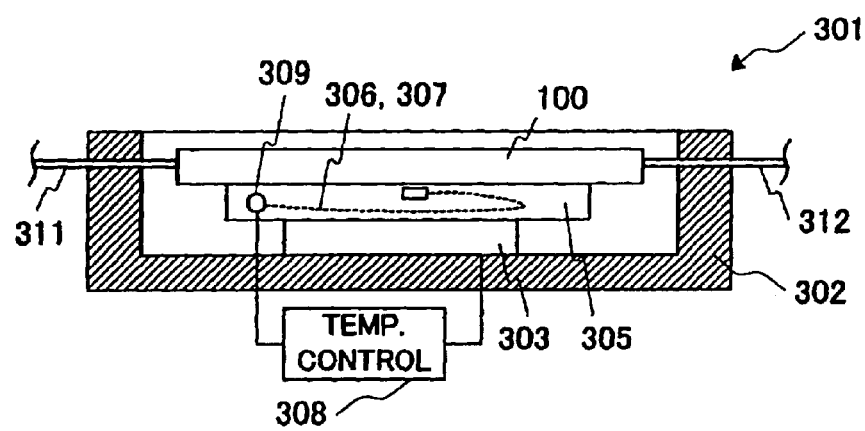
FIG. 29 shows the outline of the structure of an array waveguide module using the first embodiment of the array waveguide grating as a second embodiment of the present invention.

FIG. 29 shows the outline of the structure of an array waveguide module using the first embodiment of the array waveguide grating described above as a second embodiment of the present invention. The illustrated array waveguide grating module 301 comprises a box-like case 302, a temperature control element 303 disposed on the bottom of the case 302 and constituted by a Velch element for heating and cooling, an array waveguide grating 100 and a metal plate 305 intervening between the temperature control element 303 and the array waveguide element 100. In this embodiment, the metal plate 305 is a high heat conductivity copper plate. The metal plate 305 has a size greater than the contact size of the temperature control element 303 to provide for enlarged temperature control zone of the temperature control element 303.

The metal plate 305 has a groove, in which a temperature sensor 306 is buried together with high heat conductivity material 307. The detected temperature output is inputted to a temperature control circuit 308 for temperature control of the temperature control element 303. The temperature sensor 306 buried in the metal plate 305 is led out to the outside from a position 309. In this embodiment, the temperature sensor 306 is a thermistor.

Optical fibers 311 and 312 are led out from the side of the first and second channel waveguides 102 and 103 of the array waveguide grating 100 to the outside of the case 302. The optical fiber 311 has one end connected to the first channel waveguide 102 and the other end connected to a light source side (not shown). The optical fiber has one end connected to the second channel waveguide 103 and the other end connected to a circuit part (not shown) for processing light signals after demultiplexing.

Figure 30:
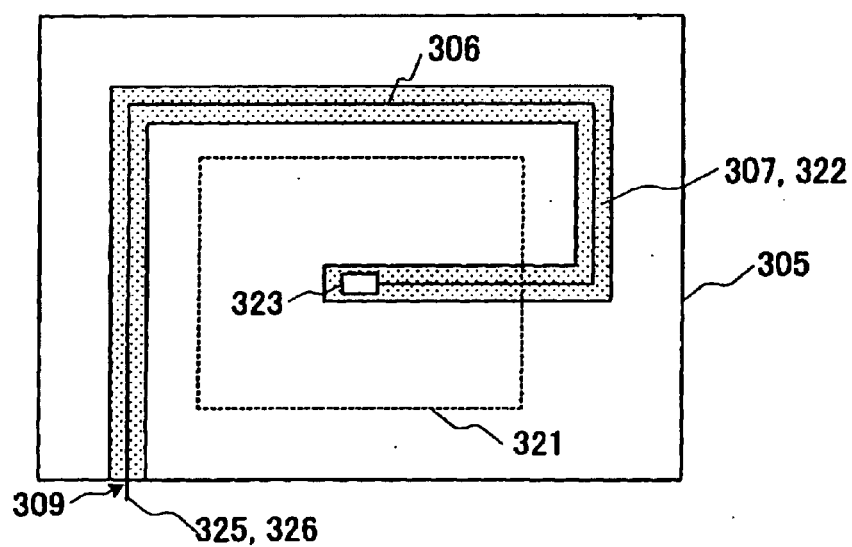
FIG. 30 shows the metal plate with the temperature sensor buried therein.

FIG. 30 shows the metal plate with the temperature sensor buried therein. Shown enclosed in dashed rectangle 321 on the metal plate 305 is a temperature detection area, which is in contact with an area including the channel waveguide array 104 and the first and second sector-shape slab waveguides 105 and 106. By controlling the temperature of the area 321 to a predetermined temperature by highly accurately detecting the temperature, it is possible to prevent characteristics changes due to temperature variations in the array waveguide grating 100.

The surface of the metal plate 305 has a groove 22, which is cut such as to extend from the substantial center of the temperature detection area and draw an angularly spiral trace. In the groove 22, the temperature sensor 306 is buried together with the high heat conductivity material 307. The temperature sensor 306 has a temperature sensing part 323 located at its end, which is buried in the temperature detecting area 321 substantially at the center thereof. From this position, a pair of led lines 325 and 326 are led spirally through the metal plate 305 and to the outside from position 309. The pair lead lines 325 and 326 are relatively thin lines.

In this embodiment of the array waveguide grating module 301, the temperature sensing part 323 of the temperature sensor 306 is buried in the metal plate 305 and the groove 322 is closed by the array waveguide grating 100. Also, as shown in FIG. 30, the pair leads 325 and 326 which are liable to feed back heat to the temperature sensing part 323, are buried together with the high heat conductivity material 307 in the metal plate 305. Furthermore, the lead lines 325 and 326 are not led from the position of the temperature sensing part 323 straight a shortest distance through the metal plate 305, but it is led spirally as one form of curved trace to provide an increased distance.

It will bee seen that, instead of thermal feedback of the ambient temperature from the position 309 through the lead lines 325 and 326 to the temperature sensing part 323, heat energy corresponding to the temperature change is absorbed in the metal plate 305 through the relatively long lead lines 325 and 326 buried therein. Since the metal plate 305 itself is temperature controlled to a predetermined temperature by the temperature control element 303, the influence of the ambient temperature from the neighborhood of the position 309, like the ambient temperature influence from the other part of the metal plate 305, is weakened as one goes into the metal plate 305. Thus, in the temperature detecting area 321 located in the neighborhood of the center of the inside of the metal plate 105, the lead lines 325 and 326 are substantially at the same temperature as the metal in this area. Thus, the ambient temperature can not be considered to be fed back to the temperature sensing part 323.

Thus, in the array waveguide grating module 301, the temperature sensing part 323 can accurately measure the temperature of part of the array waveguide grating 100 corresponding to the temperature detection area 321 without being adversely affected by the ambient temperature, and it is possible to realize stable temperature control irrespective of ambient temperature changes.

Figure 31:
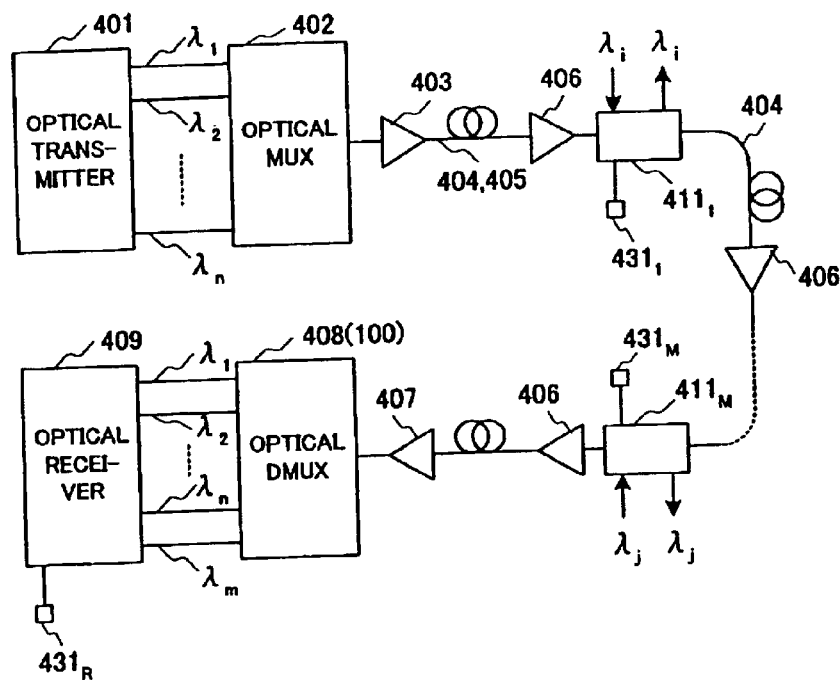
FIG. 31 shows the outline of the structure of an optical communication system as a third embodiment of the present invention.

FIG. 31 shows the outline of the structure of an optical communication system as a third embodiment of the present invention. In this optical communication system, light signals of N channels of wavelengths $\lambda_1$ to $\lambda_n$ sent out from an optical transmitter 401 connected to an SONET (Synchronous optical Network) apparatus (not shown) disposed on the transmission side, are multiplexed in an optical MUX (multiplexer) 402, and amplified in a booster amplifier 403 and then sent out to an optical transmission line 404. The multiplexed light signal 405 is appropriately amplified in an in-line amplifier 406, and then fed through a pre-amplifier 407 to an optical demultiplexer (DMUX) 408 for demultiplexing to the initial wavelengths $\lambda_1$ to $\lambda_n$, which are received in an optical receiver 409. A suitable number of nodes (ADM) $411_1$ to $411_M$ are disposed in the optical transmission line 404. Light signals having desired wavelengths are inputted in and outputted from the nodes $411_1$ to $411_M$. The optical demultiplexer 408 is constituted by an array waveguide grating 100 like that as shown in FIG. 21.

Figure 32:
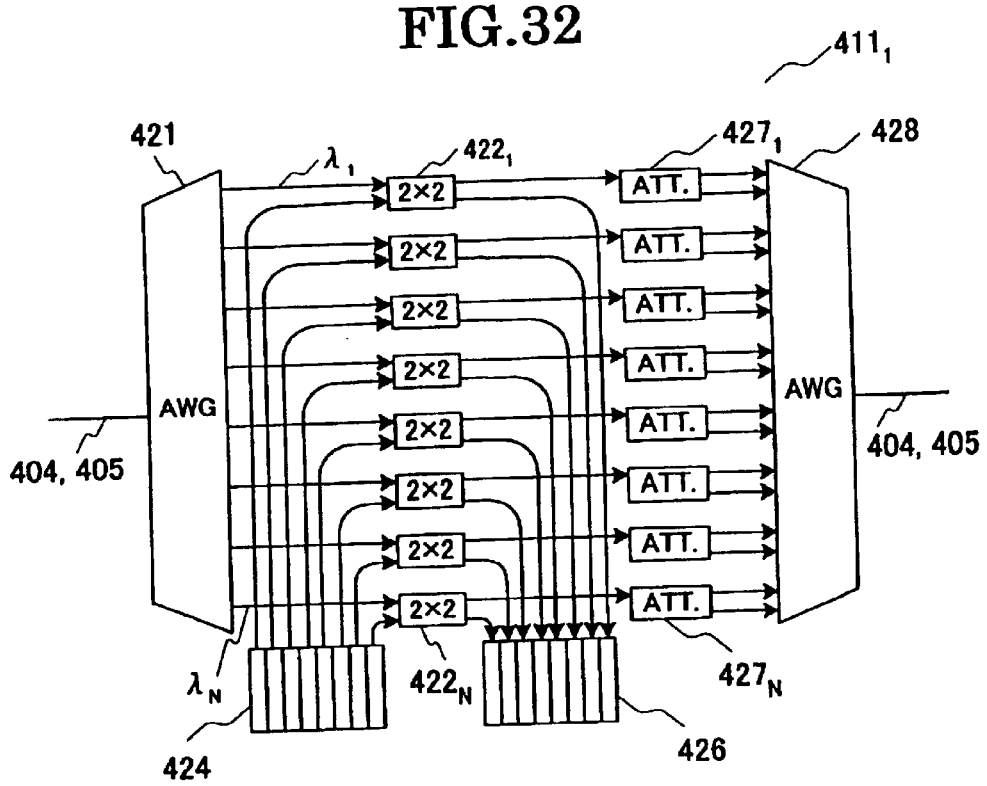
FIG. 32 shows an outline of the construction of the nodes.

FIG. 32 shows an outline of the construction of the nodes. Here, the first node $111_1$ (see FIG. 31) is shown. The second to M-th nodes $411_2$ to $411_M$ are principally the same in structure. In the optical transmission line 404 shown in FIG. 21 is inputted to an input side array waveguide grating 421 of the first node 4111 for demultiplexing it light signals of N channels of wavelengths $\lambda_1$ to $\lambda_n$. Two-input two-output optical switches $422_1$ to $422_N$ provided for the wavelengths $\lambda_1$ to $\lambda_n$ respectively, drop the light signals of the wavelengths $\lambda_1$ to $\lambda_n$ in the node side receiver 426, while transmitted light signals are added from the node side transmitter 424. The outputs of the two-input two-output optical switches $422_1$ to $422_N$ are gain adjusted in ATTs (attenuators) $427_1$ to $427_N$ and then inputted to an output side array waveguide grating 428. The output side array waveguide grating 428 is an element having a converse structure to the input side array waveguide grating 421. The light signals of the N channels of wavelengths $\lambda_1$ to $\lambda_n$ are multiplexed and sent out to the optical transmission line 404 as the light signal 405.

As shown, as well as the first node $411_1$ shown in FIG. 32, the second to M-th nodes $411_2$ to $411_M$ and the optical demultiplexer 408 all use the array waveguide grating 100 shown in FIG. 21. The above light signal of the wavelength $\lambda_m$ outputted from the output side waveguide (i.e., monitor waveguide) when monitor light signal is inputted from the input side waveguide, are progressively monitored for wavelength compensation of the other output side waveguides, to which the light signals of wavelengths $\lambda_1$ to $\lambda_n$ are outputted. Thus, as shown in FIG. 31 the nodes $411_1$ to $411_N$ and the optical receiver 409 have output monitor/control units $431_1$ to $431_M$ and $431_R$, respectively.

The array waveguide grating 100, when used as multiplexer, can effect like wavelength compensation by progressively monitoring the light signal of wavelength in outputted from the intrinsic input side waveguide (monitor waveguide) with monitor light signal inputted from the intrinsic output side waveguide. Although not shown in this embodiment, it is likewise possible to make compensation of the array waveguide grating 101 on the side of the output side array waveguide grating 428 in the optical transmitter 401 and the nodes $411_1$ to $411_M$. To this end, output monitor/control units may be provided.

The above embodiments have been described by assuming that they use optical waveguides including exponential function shape part. The exponential function, however, is developed as a function of a high degree such as the third degree. In this sense, the present invention is of course applicable as well to the case, in which waveguides of or having shapes represented by high degree functions other than the second degree, for instance third or fourth degree, are inserted between channel waveguides and slab waveguide.

As has been described in the foregoing, according to the first, third, twelfth, sixteenth, nineteenth to twenty-eighth, thirty-first and thirty-sixth aspects, at least either the open part of each of the first channel waveguides on the side of the first slab waveguide or the open part of each of the second channel waveguides of the side of the second slab waveguide has a shape part flaring in the exponential function shape toward the channel waveguide array, not only it is possible to improve the optical frequency characteristics of light signals over the case involving the sole second degree function shape optical waveguide shape but it is also possible to improve the degree of freedom of design over the case involving the sole rectangular or taper shape optical waveguide. It is thus possible to cope with various demands flexibly.

Also, according to the second, third to thirteenth, seventeenth, twentieth to twenty-eighth, thirty-second and thirty-seventh aspects, at least the open part of each of the first channel waveguide on the side of the first slab waveguide or the open part of each of the second channel waveguides on the side of the second slab waveguide at least partly has a shape part flaring in the exponential function shape toward the channel waveguide array, not only it is possible to improve the optical frequency characteristics of light signals over the case involving the sole second degree function shape optical waveguide shape but also it is possible improve the degree of freedom of design over the case involving the sole rectangular or taper shape optical waveguide. It is thus possible to cope with various demands flexibly.

Furthermore, according to the fifteenth, twenty-ninth, thirty-third and fortieth aspects, at least either the open part of each of the first channel waveguides on the side of the first slab waveguide or the open part of each of the second channel waveguides on the side of the second slab waveguide has a shape portion flaring in the exponential function shape represented by a function of a degree higher than the second degree, not only it is possible to improve the optical frequency characteristics of light signals over the case involving the sole second degree function shape optical waveguide shape but it is also possible to improve the degree of freedom of design over the case involving the sole rectangular or taper shape optical waveguide. It is thus possible to cope with various demands flexibly.

According to the fourteenth, eighteenth, twenty-fourth and thirty-first to fortieth aspects, it is possible to increase the light signal transmission width over the prior art case involving the second degree function shape optical function shape. Thus, in the case of connecting multiple stages of array waveguide gratings, it is possible to obtain the advantage that the rate of reduction of the signal transmission bandwidth is reduced.

Changes in construction will occur to those skilled in the art and various apparently different modifications and embodiments may be made without departing from the scope of the present invention. The matter set forth in the foregoing description and accompanying drawings is offered by way of illustration only. It is therefore intended that the foregoing description be regarded as illustrative rather than limiting.

What is claimed is:

1. An array waveguide grating comprising:
   a predetermined substrate;
   a first channel waveguide comprising a first plurality of component waveguides and a second channel waveguide comprising a second plurality of component waveguides for light wave transfer on the substrate;

a channel waveguide array comprising a third plurality of component waveguides having lengths progressively increasing with a predetermined difference between adjacent ones of the waveguides on the substrate;

a first slab waveguide for connecting ends of the first channel waveguides and one end of each component waveguide of the channel waveguide array via a waveguide part having a first shape on the substrate; and a second slab waveguide for connecting one end of the second channel waveguides and the other end of each component waveguide of the channel waveguide array via a waveguide part having a second shape on the substrate;

wherein at least one of said first shape and said second shape includes a flaring in an exponential function shape toward the channel waveguide array.

2. The array waveguide grating according to claim 1, wherein the shape W(X) flaring in the exponential function shape is represented as $$W(X)=(Wp-Wc)*(1-\exp(-a*X))+Wc$$

where X represents a light wave progress direction, Wp is a width of the end of the shape connected to the slab waveguide, Wc is a spread of the waveguide part in directions perpendicular to the light wave progress direction X, and a represents a parameter (i.e., shape variable) giving the exponential function shape.

3. The array waveguide grating according to claim 2, wherein the shape variable a giving the exponential function shape is unity or less.

4. The array waveguide grating according to claim 2, wherein both of the first shape and second shape have a shape flaring in an exponential function shape from the side of the channel waveguides toward the channel waveguide array and each have a different value of the shape variable a.

5. The array waveguide grating according to claim 2, wherein at least one of the first shape and the second shape has a shape flaring in an exponential function shape toward the channel waveguide array, and the value of the shape variable a is set independently to a value corresponding to a corresponding channel waveguide.

6. An array waveguide grating comprising:

a predetermined substrate;

a first channel waveguide comprising a first plurality of component waveguides and a second channel waveguide comprising a second plurality of component waveguides for light wave transfer on the substrate;

a channel waveguide array comprising a third plurality of component waveguides having lengths progressively increasing with a predetermined difference between adjacent ones of the waveguides on the substrate;

a first slab waveguide for connecting ends of the first channel waveguides and one end of each component waveguide of the channel waveguide array via a waveguide part having a first shape on the substrate; and a second slab waveguide for connecting one end of each waveguide of the second channel waveguides and the other end of the channel waveguide array via waveguide part having a second shape on the substrate;

wherein at least a portion of at least one of said first shape and said second shape includes a flaring in an exponential function shape toward the channel waveguide array.

7. The array waveguide grating according to claim 6, wherein at least one of said first shape and said second shape includes a shape not shaped in said exponential shape and said shape not shaped in said exponential shape comprises a taper shape.

8. The array waveguide grating according to claim 6, wherein at least one of said first shape and said second shape includes a shape not shaped in said exponential shape and said shape not shaped in said exponential shape comprises a second degree function shape.

9. The array waveguide grating according to claim 6, wherein at least one of said first shape and said second shape includes a shape not shaped in said exponential shape and said shape not shaped in said exponential shape comprises both a taper shape and a second degree function shape.

10. The array waveguide grating according to claim 6, wherein at least one of said first shape and said second shape includes a second portion not shaped in said exponential shape and said shape comprises a taper shape part.

11. The array waveguide grating according to claim 6, wherein at least one of said first shape and said second shape includes a second portion not shaped in said exponential shape and said shape comprises a second degree function shape part.

12. The array waveguide grating according to claim 6, wherein at least one of said first shape and said second shape includes a second portion not shaped in said exponential shape and said shape comprises a taper shape part and a second degree function shape part.

13. The array waveguide grating according to claim 6, wherein the shape W(X) flaring in the exponential function shape is represented as $$W(X)=(Wp-Wc)*(1-\exp(-a*X))+Wc$$

where X represents a light wave progress direction, Wp is a width of the end of the shape connected to the slab waveguide, Wc is a spread of the wavelength part in directions perpendicular to the light wave progress direction X, and a represents a parameter (i.e., shape variable) giving the exponential function shape.

14. An array waveguide grating comprising: a predetermined substrate;

a first channel waveguide comprising a first plurality of component waveguides and a second channel waveguide comprising a second plurality of component waveguides for light wave transfer on the substrate;

a channel waveguide array comprising a third plurality of component waveguides having lengths progressively increasing with a predetermined difference between adjacent ones of the waveguides on the substrate;

a first slab waveguide for connecting ends of the first channel waveguides and one end of each component waveguide of the channel waveguide array via a waveguide part having a first shape on the substrate; and a second slab waveguide for connecting one end of the second channel waveguides and the other end of each component waveguide of the channel waveguide array via a waveguide part having a second shape on the substrate;

wherein at least a portion of at least one of said first shape and said second shape includes a shape part flaring in an exponential function shape represented by a function of a degree higher than the second degree toward the channel waveguide array.

15. The array waveguide grating according to claim 14, wherein the flaring shape part represented by the function of a degree higher than the second degree comprises:

such a convex shape that, when frequency multiplexed Gaussian waveform light waves pass through their waveguides, their characteristics line in a range between boundary ranges of characteristics with respect to a transmission width and a cross-talk when they pass through the rectangular waveguides and second degree function shape waveguides.

16. An array waveguide grating comprising:
first channel waveguide comprising a first plurality of component waveguides and second channel waveguide comprising a second plurality of component waveguides for light wave transfer;
a channel waveguide array comprising a third plurality of component waveguides having lengths progressively increasing with a predetermined difference between adjacent ones of the waveguides;
a first slab waveguide disposed between the first channel waveguides and one end of the channel waveguide array; and
a second slab waveguide disposed between the second channel waveguides and the other end of the channel waveguide array;
wherein at least an open part of each of the first channel waveguides on the side of a first slab waveguide and the second channel waveguides on a side of the second slab waveguide has an opening width greater than a waveguide width of the first channel and second channel waveguides; and
the shape directed from a stem part of the open part toward the open end is found on the inner side of rectangular shape of the opening width and on the outer side of a second degree curve connecting the stem part and the open end.

17. An array waveguide grating module comprising:
an array waveguide grating comprising:
 a predetermined substrate,
 a first channel waveguide array comprising a first plurality of component waveguides and a second channel waveguide comprising a second plurality of component waveguides for light wave transfer on the substrate,
 a channel waveguide array comprising a third plurality of component waveguides having lengths progressively increasing with a predetermined difference between adjacent ones of the waveguides on the substrate,
 a first slab waveguide for connecting the ends of the first channel waveguides and one end of each component waveguide of the channel waveguide array via a waveguide part having a first shape on the substrate, and
 a second slab waveguide for connecting one end of the second channel waveguides and the other end of each component waveguide of the channel waveguide array via a second connecting waveguide part having a second shape on the substrate,
 wherein at least one of said first shape and said second shape includes a flaring in an exponential function shape toward the channel waveguide array; and
an optical fiber having one end optically connected to at least one of the first channel waveguide and the second channel waveguide of the array waveguide grating.

18. The array waveguide grating module according to claim 17, wherein the shape W(X) flaring in the exponential function shape is represented as $$W(X)=(Wp-Wc)*(1-\exp(-a*X))+Wc$$

where X represents a light wave progress direction, Wp is a width of the end of the shape connected to the slab waveguide, Wc is a spread of the waveguide part in directions perpendicular to the light wave progress direction X, and a represents a parameter (i.e., shape variable) giving the exponential function shape.

19. The array waveguide grating module according to claim 18, wherein the shape variable a giving the exponential function shape is unity or less.

20. The array waveguide grating module according to claim 18, wherein both of the first shape and second shape have a shape flaring in an exponential function shape from the side of the channel waveguides toward the channel waveguide array and each have a different value of the shape variable a.

21. The array waveguide grating module according to claim 18, wherein at least one of the first shape and the second shape has a shape flaring in an exponential function shape toward the channel waveguide array, and the value of the shape variable a is set independently to a value corresponding to a corresponding channel waveguide.

22. The array waveguide grating module according to claim 17, wherein at least one of said first shape and said second shape includes a shape not shaped in said exponential shape and said shape not shaped in said exponential shape comprises a taper shape.

23. The array waveguide grating module according to claim 17, wherein at least one of said first shape and said second shape includes a shape not shaped in said exponential shape and said shape not shaped in said exponential shape comprises a second degree function shape.

24. The array waveguide grating module according to claim 17, wherein at least one of said first shape and said second shape includes a shape not shaped in said exponential shape and said shape not shaped in said exponential shape comprises both a taper shape and a second degree function shape.

25. An array waveguide grating module comprising:
an array waveguide grating comprising:
 a predetermined substrate,
 a first channel waveguide comprising a first plurality of component waveguides and a second channel waveguide comprising a second plurality of component waveguides for light wave transfer on the substrate,
 a channel waveguide array comprising a third plurality of component waveguides having lengths progressively increasing with a predetermined difference between adjacent ones of the waveguides on the substrate,
 a first slab waveguide for connecting the ends of the first channel waveguides and one end of each component waveguide of the channel waveguide array via a waveguide part having a first shape on the substrate, and
 a second slab waveguide for connecting one end of the second channel waveguides and the other end of each component waveguide of the channel waveguide array via a second connecting waveguide part having a second shape on the substrate;
 wherein at least a portion of at least one of said first shape and said second shape includes a flaring in an exponential function shape toward the channel waveguide array; and
an optical fiber having one end optically connected to at least one of the first channel waveguide and the second channel waveguide of the array waveguide grating.

26. The array waveguide grating module according to claim 25, wherein at least one of said first shape and said second shape includes a second portion not shaped in said exponential shape and said second portion comprises a taper shape part.

27. The array waveguide grating module according to claim 25, wherein at least one of said first shape and said second shape includes a second portion not shaped in said exponential shape and said second portion comprises a second degree function shape part.

28. The array waveguide grating module according to claim 25, wherein at least one of said first shape and said second shape includes a second portion not shaped in said exponential shape and said second portion comprises a taper shape part and a second degree function shape part.

29. The array waveguide grating module according to claim 25, wherein the shape W(X) flaring in the exponential function shape is represented as $$W(X)=(Wp-Wc)*(1-\exp(-a*X))+Wc$$

where X represents a light wave progress direction, Wp is a width of the end of the exponential function shape connected to the slab waveguide, Wc is a spread of the wavelength part in directions perpendicular to the light wave progress direction X, and a represents a parameter (i.e., shape variable) giving the exponential function shape.

30. The array waveguide grating module according to claim 25, wherein at least one of said first shape and said second shape includes a second portion not shaped in said exponential shape and said second portion comprises a taper shape.

31. The array waveguide grating module according to claim 25, wherein at least one of said first shape and said second shape includes a second portion not shaped in said exponential shape and said second portion comprises a second degree function shape.

32. The array waveguide grating module according to claim 25, wherein at least one of said first shape and said second shape includes a second portion not shaped in said exponential shape and said second portion comprises both a taper shape and a second degree function shape.

33. An array waveguide grating module comprising:
an array waveguide grating comprising:
a first channel waveguide comprising a first plurality of component waveguides and a second channel waveguide comprising a second plurality of component waveguides for light wave transfer,
a channel waveguide array comprising a third plurality of component waveguides having lengths progressively increasing with a predetermined difference between adjacent ones of the waveguides,
a first slab waveguide disposed between the first channel waveguides and one end of the channel waveguide array, and
a second slab waveguide disposed between the second channel waveguides and the other end of the channel waveguide array,
wherein at least an open part of each of one of the first channel waveguides on a side of the first slab waveguide and the second channel waveguides on a side of the second slab waveguide has an opening width greater than a waveguide width of the plurality of waveguides of the channel waveguide, and a shape directed from a stem part of the open part toward the open end is found on the inner side of rectangular shape of the opening width and on the outer side of a second degree curve connecting the stem part and the open end; and
an optical fiber having one end optically connected to at least part of the first or second channel waveguides of the array waveguide grating.

34. An array waveguide grating module comprising:
an array waveguide grating comprising:
a predetermined substrate,
a first channel waveguide comprising a first plurality of component waveguides and a second channel waveguide comprising a second plurality of component waveguides for light wave transfer on the substrate,
a channel waveguide array comprising a third plurality of component waveguides having lengths progressively increasing with a predetermined difference between adjacent ones of the waveguides on the substrate,
a first slab waveguide for connecting ends of the first channel waveguides and one end of each component waveguide of the channel waveguide array via a waveguide part having a first shape on the substrate, and
a second slab waveguide for connecting one end of the second channel waveguides and the other end of each component waveguide of the channel waveguide array via a second connecting waveguide part having a second shape on the substrate, wherein at least a portion of at least one of said first shape and said second shape includes a flaring in an exponential function shape represented by a function of a degree higher than the second degree toward the channel waveguide array; and
an optical fiber having one end optically connected to at least part of the first or second channel waveguides of the array waveguide grating.

35. The array waveguide grating module according to claim 34, wherein the flaring exponential function shape part represented by the function of a degree higher than the second degree has such a convex shape that, when frequency multiplexed Gaussian waveform light waves pass through their waveguides, their characteristics line in a range a between boundary ranges of characteristics with respect to a transmission width and a cross-talk when they pass through the rectangular waveguides and second degree function shape waveguides.

36. An array waveguide grating comprising:
a first channel waveguide comprising a first plurality of component waveguides and a second channel waveguide comprising a second plurality of component waveguides for light wave transfer on the substrate,
a first slab waveguide for receiving ends of the waveguides of the first channel waveguide via first connecting waveguide parts, the first connecting waveguide parts each having an open end comprising a first portion and a second portion; and
a second slab waveguide for receiving one end of the waveguides of the second channel waveguide via a second connecting waveguide part, the second connecting waveguide part having an open end comprising a first portion and a second portion;
wherein at least the first portion of the open end of said first connecting waveguide part and the first portion of the open end of said second connecting waveguide part have a flaring in an exponential function shape toward the channel waveguide array.

37. The array waveguide grating according to claim 36, wherein the exponential function shape of the first portion of the open end of said first connecting waveguide part comprises the same exponential function shape of the first portion of the open end of said second connecting waveguide part.

38. The array waveguide grating according to claim 36, wherein the exponential function shape of the first portion of the open end of said first connecting waveguide part comprises a different exponential function shape of the first portion of the open end of said second connecting waveguide part.

39. An array waveguide grating comprising:

a first channel waveguide comprising a first plurality of component waveguides;

a first slab waveguide connected to one end of each of a waveguide of said first channel waveguide by way of an opening having a first shape;

a second channel waveguide comprising a second plurality of component waveguides;

a second slab waveguide connected to one end of each of a waveguide of said second channel waveguide by way of an opening having a second shape; and a channel waveguide array interconnecting said first slab waveguide and said second slab waveguide;

wherein at least a portion of at least one of said first shape and said second shape is flared in an exponential function shape.

* * * * *